US012274372B1

(12) United States Patent
Lian

(10) Patent No.: US 12,274,372 B1
(45) Date of Patent: Apr. 15, 2025

(54) INFLATABLE SEAT

(71) Applicant: Shandong Longming Information Technology Co., Ltd, Qingdao (CN)

(72) Inventor: Xiangpeng Lian, Rongcheng (CN)

(73) Assignee: Shandong Longming Information Technology Co., Ltd, Qingdao (CN)

( * ) Notice: Subject to any disclaimer, the term of this patent is extended or adjusted under 35 U.S.C. 154(b) by 0 days.

(21) Appl. No.: 18/890,837

(22) Filed: Sep. 20, 2024

Related U.S. Application Data

(63) Continuation of application No. PCT/CN2024/119007, filed on Sep. 14, 2024.

(30) Foreign Application Priority Data

Nov. 30, 2023 (CN) .......................... 202311631267.6

(51) Int. Cl.
  *A47C 4/54* (2006.01)
  *A01K 97/22* (2006.01)
  *A47C 9/10* (2006.01)

(52) U.S. Cl.
  CPC ............... *A47C 4/54* (2013.01); *A01K 97/22* (2013.01); *A47C 9/10* (2013.01)

(58) Field of Classification Search
  CPC .. A47C 4/54; A47C 9/10; B63B 7/085; B63B 34/22; B63B 7/08; A01K 97/22
  See application file for complete search history.

(56) References Cited

U.S. PATENT DOCUMENTS

| 2,437,602 | A | * | 3/1948 | Hann | ........................ | A47C 4/54 |
| | | | | | | 297/452.41 |
| 3,112,956 | A | * | 12/1963 | Schick | .................... | A47C 7/029 |
| | | | | | | 297/229 |
| 3,680,917 | A | * | 8/1972 | Harris | ...................... | A47C 4/54 |
| | | | | | | 297/452.41 |
| 4,108,492 | A | * | 8/1978 | Kirby | ...................... | A47C 7/467 |
| | | | | | | 297/284.6 |
| 4,836,605 | A | * | 6/1989 | Greenwood | ........... | A47D 1/103 |
| | | | | | | 297/452.41 |
| 5,529,377 | A | * | 6/1996 | Miller | ....................... | A47C 4/54 |
| | | | | | | 297/284.6 |
| 9,433,301 | B2 | * | 9/2016 | Brechet | .................... | A47C 4/54 |
| 11,969,105 | B1 | * | 4/2024 | Lian | ..................... | A47C 31/006 |
| 2005/0269858 | A1 | * | 12/2005 | Leutert | ............. | B64D 11/0647 |
| | | | | | | 297/452.41 |
| 2011/0006568 | A1 | * | 1/2011 | Hsu | ...................... | A47C 31/126 |
| | | | | | | 297/217.3 |

* cited by examiner

*Primary Examiner* — Robert Canfield
(74) *Attorney, Agent, or Firm* — Ying-Ting Chen

(57) ABSTRACT

An inflatable seat includes a seat part and a backrest part which is connected to the seat part to define an inflation chamber, wherein the backrest part comprises a first layer and a second layer, wherein the second layer includes a first folding line and a second folding line which are connected with each other to form a connecting seam, wherein when the backrest part is inflated, the connecting seam causes the second layer to be deformed to form a concave groove while the first layer forms a protrusion section for supporting a waist of a user.

21 Claims, 18 Drawing Sheets

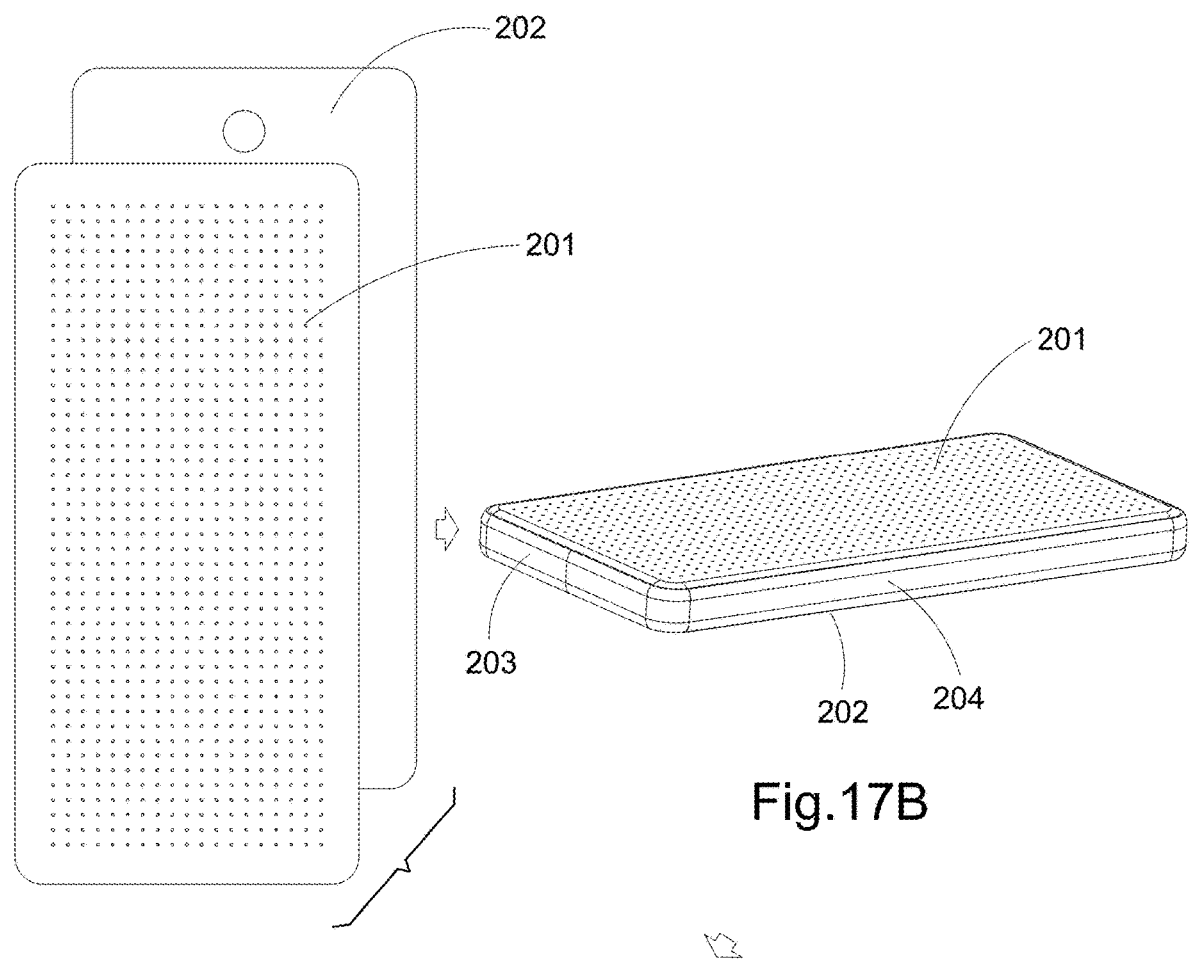
Fig.17A
Fig.17B
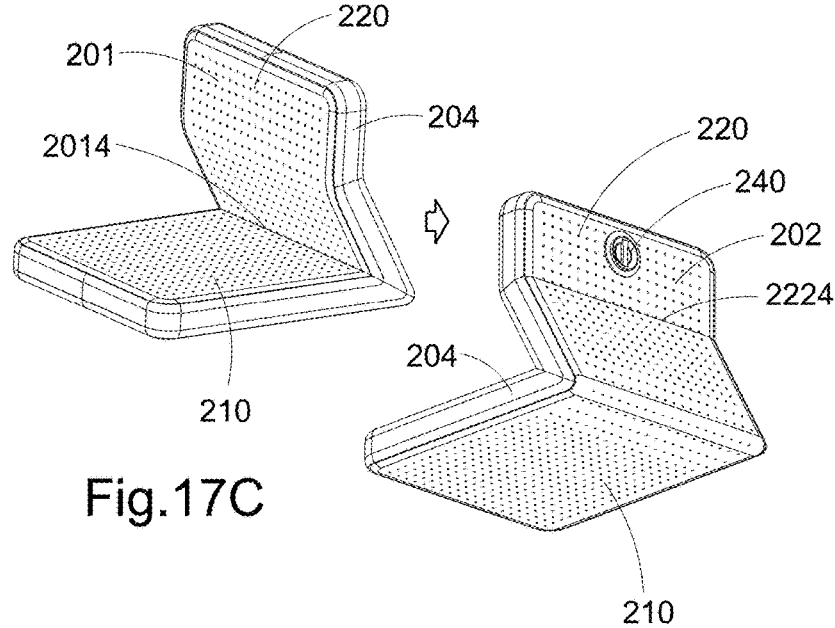
Fig.17C
Fig.17D

INFLATABLE SEAT

CROSS REFERENCE OF RELATED APPLICATION

This application is a Continuation Application of PCT/CN2024/119007, filed on Sep. 14, 2024, which claims the benefit of Chinese patent application number CN202311631267.6, filing date Nov. 30, 2023, wherein the entire content of which is expressly incorporated herein by reference.

BACKGROUND OF THE PRESENT INVENTION

Field of Invention

The present invention relates to the technical field of household goods, especially relates to an inflatable seat and a manufacturing method thereof.

Description of Related Arts

As the standard of living improves and there are more and more ways to relax, people's demand for comfortable home furnishings is also higher and higher. A conventional seat generally has its frame structure made of wood or metal, which is filled with sponge and covered with a pavement leather material. Although these seats are comfortable, they have a complex structure, cumbersome manufacturing process, and large volume, and large weight, which cannot be folded and is not easy to store and carry.

In order to maintain the comfort of the seat while making it easy to fold, inflatable seats have appeared on the market. However, a conventional inflatable seat does not have a backrest that conforms to the curvature of the human body's lumbar back region, which can easily cause lumbar spine pain and fatigue when sitting for a long time.

As shown in FIG. 1 of the drawings, a flat design of the backrest of the conventional inflatable seat presents several disadvantages, particularly in terms of comfort and ergonomic support. More specifically, the flat back of the chair fails to provide adequate support to the natural curvature of the spine, particularly in the lumbar region. This lack of support means that the waist is left unsupported, forcing the muscles in the lower back to remain engaged in an effort to maintain proper posture. Over time, this can lead to muscle fatigue and discomfort.

Despite the back being in contact with the chair, the absence of proper contouring or padding in the lumbar area results in the waist muscles staying tense. This tension can prevent the muscles from relaxing, leading to strain and potentially exacerbating issues like lower back pain, especially during prolonged periods of sitting.

The continuous lack of support and the resulting muscle tension can cause discomfort to accumulate over time. Users may find it difficult to relax or maintain a comfortable seating position, which could reduce the chair's usability for extended periods and negatively impact the user's overall experience. A conventional inflatable seat that does not allow the waist to rest fully hinders the body's ability to recover from fatigue, particularly in activities that require sitting for long durations. Without the opportunity to relax the lower back muscles, the user may experience increased discomfort and reduced productivity or enjoyment in the activity for which the chair is being used.

In addition, inflatable paddle boards have surged in popularity in recent years. However, users may find it uncomfortable to kneel or sit directly on the top surface of the paddle board for extended periods, leading to fatigue or discomfort during longer sessions. The absence of a suitable seat restricts the user's ability to take breaks in a comfortable sitting position, which can be especially important during long-distance paddling or for users with limited stamina.

SUMMARY OF THE PRESENT INVENTION

Based on this, it is necessary to propose an inflatable seat which is comfortable to sit on and not easy to cause lumbar spine pain, and a manufacturing method thereof.

The present disclosure provides an inflatable seat, including a main body made of an inflation brushed cloth and a side wall surrounding the main body; wherein the main body includes a first side and a second side opposite to each other, the side wall connecting the first side and the second side; the first side includes a first surface, and the second side includes a second surface; the main body is bendable to form a cushion and a backrest; the first surface includes a plurality of first surface regions, and the first side further includes a plurality of PVC sandwich mesh fabric regions arranged on the backrest, the plurality of PVC sandwich mesh fabric regions being each in a shape of an elongated strip and horizontally interspersed with the plurality of first surface regions.

In some embodiments, the side wall is made of a PVC sandwich mesh fabric.

In some embodiments, the second side is arranged with an inflation port.

In some embodiments, the first side is arranged with a first horizontal stitching line below the plurality of PVC sandwich mesh fabric regions and a second horizontal stitching line below the first horizontal stitching line; the first horizontal stitching line is connected to the second horizontal stitching line, enabling the main body to bend forward.

In some embodiments, an upper end of the side wall is arranged with a carrying handle.

In some embodiments, the second side is arranged with a third horizontal stitching line and a fourth horizontal stitching line spaced apart from each other at a position away from the carrying handle; the third horizontal stitching line is connected to the fourth horizontal stitching line, enabling the main body to bend backward.

The present disclosure provides an inflatable seat, including a main body made of an inflation brushed cloth and a side wall surrounding the main body; where the main body includes a first side and a second side opposite to each other, the side wall connecting the first side and the second side; the first side includes a first surface, and the second side includes a second surface; the main body bends to form a cushion and a backrest; the first surface includes multiple first surface regions, and the first side further includes multiple PVC sandwich mesh fabric regions arranged on the backrest, the PVC sandwich mesh fabric regions being each in the shape of an elongated strip and horizontally interspersed with the multiple first surface regions. As the first surface is partially replaced with the PVC sandwich mesh fabric, the first side will naturally bend when the inflatable seat is in an inflated state, forming the backrest that conforms to the bending arc of the lumbar back region, which is comfortable to sit on and not easy for lumbar spine pain.

The present disclosure further provides a manufacturing method of an inflatable seat, including:

S100, providing a main body made of an inflation brushed cloth and conforming to a contour of the inflatable seat; wherein the main body includes a first side and a second side opposite to each other, the first face including a first surface and the second face including a second surface;

S200, selecting replacement regions on the first side, cutting to remove the first surface in the replacement regions, and sewing a PVC sandwich mesh fabric in the replacement regions to form a plurality of PVC sandwich fabric regions;

S300, sewing a PVC sandwich mesh fabric around a perimeter of the main body to form a side wall, wherein the side wall connects the first side and the second side; and S400, selecting a first horizontal stitching line and a second horizontal stitching line below the plurality of PVC sandwich mesh fabric regions on the first side, folding the main body such that the first horizontal stitching line and the second horizontal stitching line overlap, and sewing the first horizontal stitching line and the second horizontal stitching line with a PVC sandwich mesh fabric.

In some embodiments, the manufacturing method further includes:

S500, mounting a carrying handle at an upper end of the side wall.

In some embodiments, the manufacturing method further includes:

S600, selecting a third stitching line and a fourth stitching line at a position away from the carrying handle on the second side, folding the main body such that the third horizontal stitching line and the fourth horizontal stitching line overlap, and sewing the third horizontal stitching line and the fourth horizontal stitching line with a PVC sandwich mesh fabric.

The manufacturing method of an inflatable seat provided by the present disclosure includes the steps of: providing a main body made of an inflation brushed cloth and conforming to a contour of the inflatable seat; where the main body includes a first side and a second side opposite to each other, the first face including a first surface and the second face including a second surface; selecting replacement regions on the first side, cutting to remove the first surface in the replacement regions, and sewing a PVC sandwich mesh fabric in the replacement regions to form multiple PVC sandwich fabric regions; sewing a PVC sandwich mesh fabric around a perimeter of the main body to form a side wall, where the side wall connects the first side and the second side, and the side wall is arranged with an inflation port; selecting a first horizontal stitching line and a second horizontal stitching line below the PVC sandwich mesh fabric regions on the first side, folding the main body such that the first horizontal stitching line and the second horizontal stitching line overlap, and sewing the first horizontal stitching line and the second horizontal stitching line with a PVC sandwich mesh fabric. Since the first surface is partially replaced with the PVC sandwich mesh fabric, the first side will naturally bend when the inflatable seat is in an inflated state, forming the backrest that conforms to the bending arc of the lumbar back region, which is comfortable to sit on and not easy for lumbar spine pain.

Another advantage of the present invention is to provide an inflatable seat with a curvature of a backrest part specifically designed to fit the waist, so that by providing full support during use, this design helps in reducing fatigue, especially in activities requiring prolonged sitting or strenuous movements, like padding, fishing or camping. This ergonomic consideration highlights the product's focus on comfort and the prevention of strain on the body's core, which is essential for sustained strength and energy.

Another advantage of the present invention is to provide an inflatable seat, wherein the raised portion of the backrest part brings the user's center of gravity closer to a central position instead of shifting backward. This adjustment supports the waist of the user, allowing it to relax.

Another advantage of the present invention is to provide an inflatable seat, wherein the peak position of the raised portion of the backrest part can be adjusted by placing a support bar under a seat part thereof, so as to adjust the support position to the waist of the user. In other words, by allowing the position of the raised portion to be adjusted through the placement of the support bar under the seat part, the invention provides personalized ergonomic support. This flexibility ensures that the backrest part can be tailored to fit the unique curvature of the user's spine, particularly in the lumbar region, enhancing comfort and reducing the risk of strain. Accordingly, different users have varying body shapes and sizes, and the ability to adjust the support position makes the seat adaptable to a wide range of individuals. Whether the user has a longer or shorter torso, they can modify the backrest to provide optimal support to their waist, ensuring a comfortable seating experience for everyone.

Another advantage of the present invention is to provide an inflatable seat, wherein the proper alignment of the raised portion of the backrest part with the user's waist encourages a healthier sitting posture, which can help reduce muscle tension and fatigue. By supporting the lower back in the right position, the seat can prevent slouching and promote better spinal alignment, leading to increased comfort during extended periods of use.

Another advantage of the present invention is to provide an inflatable seat, wherein the inflatable nature of the product allows users to modify the firmness by adjusting the air pressure. This customization offers a significant comfort advantage, as different users can set the product to their preferred level of firmness, whether they need a firmer base for better support or a softer feel for relaxation.

Another advantage of the present invention is to provide an inflatable seat, wherein the product's lightweight and compact design make it easy to carry and store, crucial for outdoor activities where packing space is often limited. Its single air chamber and valve also streamline the setup and takedown process, reducing the time and effort required for inflation and deflation.

Another advantage of the present invention is to provide an inflatable seat, wherein the inclusion of just one air chamber and a single inflation valve simplifies the operation process, making it more user-friendly. This feature is particularly advantageous compared to traditional inflatable seats, which may have multiple compartments and valves, complicating the setup. The streamlined design enhances the overall user experience by reducing potential frustration during inflation.

Another advantage of the present invention is to provide an inflatable seat, wherein by eliminating unnecessary components and creating a unified design, the product is not only more visually appealing but also more functional. The seamless design reduces the likelihood of weak points or potential failure areas, enhancing the product's durability.

Another advantage of the present invention is to provide an inflatable seat, wherein the handle and four D-rings expand the product's versatility. The handle makes it easy to transport, while the D-rings allow the product to be securely attached in various scenarios, such as on a boat or at a campsite. This adaptability increases the product's usefulness across different outdoor activities.

Additional advantages and features of the invention will become apparent from the description which follows, and may be realized by means of the instrumentalities and combinations particularly pointing out in the appended claims.

According to the present invention, the foregoing and other objects and advantages are attained by a n inflatable seat, comprising:
  a seat part; and
  a backrest part which is connected to the seat part to define an inflation chamber, wherein the backrest part comprises a first layer and a second layer, wherein the second layer comprises a first folding line and a second folding line which are connected with each other to form a connecting seam, wherein when the backrest part is inflated, the connecting seam causes the second layer to be deformed to form a concave groove while the first layer forms a protrusion section.

According to an embodiment, when the backrest part is inflated, the first layer form a curved surface with a raised peak position at a center of the protrusion section.

According to an embodiment, the inflatable seat further comprises a first body layer and a second body layer which is connected to the first body layer to form the seat part and the backrest part, wherein the first layer is a part of the first body layer, the second layer is a part of the second body layer, wherein the first body layer comprises a first bending line and a second bending line which are connected with other to form a bending seam, wherein when the inflation chamber is inflated, the bending seam causes the first body layer and the second body layer to bend to form the backrest part and the seat part.

According to an embodiment, the second layer comprises a folding portion defined between the first folding line and the second folding line, wherein the first layer comprises a bending portion defined between the first bending line and the second bending line, wherein when the inflation chamber is inflated, the folding portion is positioned above the bending portion.

According to an embodiment, a length of the folding portion is smaller than a length of the bending portion.

According to an embodiment, the first folding line and the second folding line are parallel horizontal lines, wherein the first bending line and the second bending line are parallel horizontal lines.

According to an embodiment, the inflatable seat further comprises a first connecting layer which is attached to the first body layer to fix the bending seam and a second connecting layer which is attached to the second body layer to fix the connecting seam.

According to an embodiment, the inflatable seat further comprises a support bar which is arranged to be capable of being placed under the seat part to support the seat part, so as to adjust the position of the protrusion section of the backrest part when the inflatable seat is inflated.

According to an embodiment, the support bar comprises at least one inclined support surface and at least one flat base surface, wherein when the at least one flat base surface is supported on an environment surface, the at least one inclined support surface is arranged to support the seat part.

According to an embodiment, the support bar comprises a first inclined support surface, a second inclined support surface, a third flat base surface opposite to the first inclined support surface and a fourth flat base surface opposite to the second inclined support surface, wherein the first inclined support surface and the second inclined support surface are respectively arranged for supporting the seat part to allow different positions of the protrusion section of the backrest part when the inflation chamber is inflated.

According to an embodiment, the first inclined support surface and the second inclined support surface define different inclination angles with respect to an environment surface.

According to an embodiment, each of the first body layer and the second body layer is made of inflation brushed cloth, wherein the inflatable seat further comprises a first side layer and a second side layer which are respectively connected to the first body layer and the second body layer to form the inflation chamber, wherein each of the first side layer and the second side layer is made of PVC.

According to an embodiment, the support bar is detachably coupled to a bottom of the seat part through a Velcro means.

The present invention further provides an inflatable seat, comprising:
  a seat part; and
  a backrest part which is connected to the seat part to define an inflation chamber, wherein the backrest part comprises a first layer and a second layer, wherein the second layer comprises a folding portion which is folded into the inflation chamber, so as to cause the first layer to form a curved surface with a raised peak position for conforming to a back of a user when the backrest part is inflated.

According to an embodiment, the folding portion is extended into the inflation chamber, so as to be received and hidden in the inflation chamber, wherein when the backrest part is inflated, the second layer inwardly concave towards a direction of the first layer, so as to allow the first layer to form to form the curved surface.

According to an embodiment, the inflatable seat further comprises a first body layer and a second body layer which is connected to the first body layer to form the seat part and the backrest part, wherein the first layer is a part of the first body layer, the second layer is a part of the second body layer, wherein the first body layer comprises a a bending portion which is folded into the inflation chamber, so as to cause the first body layer and the second body layer to bend to form the backrest part and the seat part.

According to an embodiment, the inflatable seat further comprises a support bar which comprises a first inclined support surface, a second inclined support surface, a third flat base surface opposite to the first inclined support surface and a fourth flat base surface opposite to the second inclined support surface, wherein the first inclined support surface and the second inclined support surface are respectively arranged for supporting the seat part to allow different positions of the raised peak position of the backrest part when the inflation chamber is inflated.

The present invention further provides an inflatable seat, comprising:
  a first body layer for conforming to a back of a user, wherein the first body layer comprises two parallel bending lines which are overlapped and connected with each other;
  a second body layer opposite to the first body layer, wherein the second body layer comprises two parallel folding lines which are overlapped and connected with each other;
  a first side layer; and a second side layer, wherein the first side layer and the second side layer are connected to the first body layer and second body layer to form an inflation chamber.

According to an embodiment, the inflatable seat further comprises a support bar which comprises a first inclined support surface, a second inclined support surface, a third flat base surface opposite to the first inclined support surface and a fourth flat base surface opposite to the second inclined support surface, wherein the first inclined support surface and the second inclined support surface are respectively selectively arranged for supporting the second body layer when the inflation chamber is inflated.

The present invention further provides an inflatable seat, comprising:
 a seat part; and
 a backrest part which is connected to the seat part to define an inflation chamber, wherein the backrest part comprises a first effective inflation layer and a second effective inflation layer, wherein each of the first effective inflation layer and the second effective inflation layer is made of inflation brushed cloth and an area difference between the first effective inflation layer and the second effective inflation laye causes the first effective inflation layer to form a curved surface for conforming to a back of a user when the backrest part is inflated.

According to an embodiment, the backrest part comprises a first layer and a second layer which is shaped and sized to couple with the first layer, wherein the first layer forms the first effective inflation layer, the second layer comprises a folding portion which is folded into the inflation chamber, rendering an area of the second effective inflation layer being smaller than an area of the first effective inflation layer.

According to an embodiment, the first effective inflation layer comprises a plurality of surface regions, wherein the backrest part further comprises one or more PVC sandwich mesh fabric region each is connected between two adjacent surface regions of the first effective inflation layer, rendering an area of the first effective inflation layer being smaller than an area of the second effective inflation layer.

The present invention further provides a method for manufacturing an inflatable seat, comprising the following steps:
 (A) overlapping a first body layer with a second body layer and connect a first side layer and a second side layer to the first body layer and the second body layer to form an inflation chamber;
 (B) forming a bending seam by overlapping and connecting a first bending line and a second bending line on the first body layer; and
 (C) forming a folding seam by overlapping and connecting a first folding line and a second folding line on the second body layer.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

In order to more clearly illustrate the technical solutions in the specific embodiments or related art of the present disclosure, the accompanying drawings to be used in the description of the specific embodiments or related art will be briefly introduced below. It will be obvious that the accompanying drawings in the following description are some of the embodiments of the present disclosure, and that for those skilled in the art, other attachments can be obtained based on these accompanying drawings without putting in creative labor

FIGS. 17A, 17B, 17C and 17D are schematic view illustrating the process of manufacturing a main body of the inflatable seat according the above preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

An inflation brushed cloth is made by coating a layer of PVC film on each of front and back sides of a three-dimensional woven cloth, and front and back sides of a base cloth of the brushed cloth are each a flat fiber woven cloth. There are equally spaced long fiber filaments set up between the fiber woven cloths, such that the inflation brushed cloth can be made to maintain the front and back sides in parallel after inflation, and the inflation brushed cloth can be made to obtain a plate-like inflatable structural material after inflation.

Figure 1:
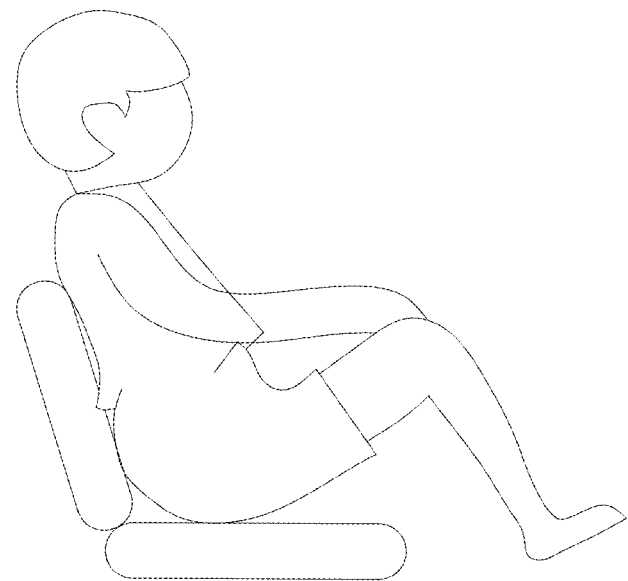
FIG. 1 is a schematic view of a state of use of a conventional inflatable seat.
Figure 2:
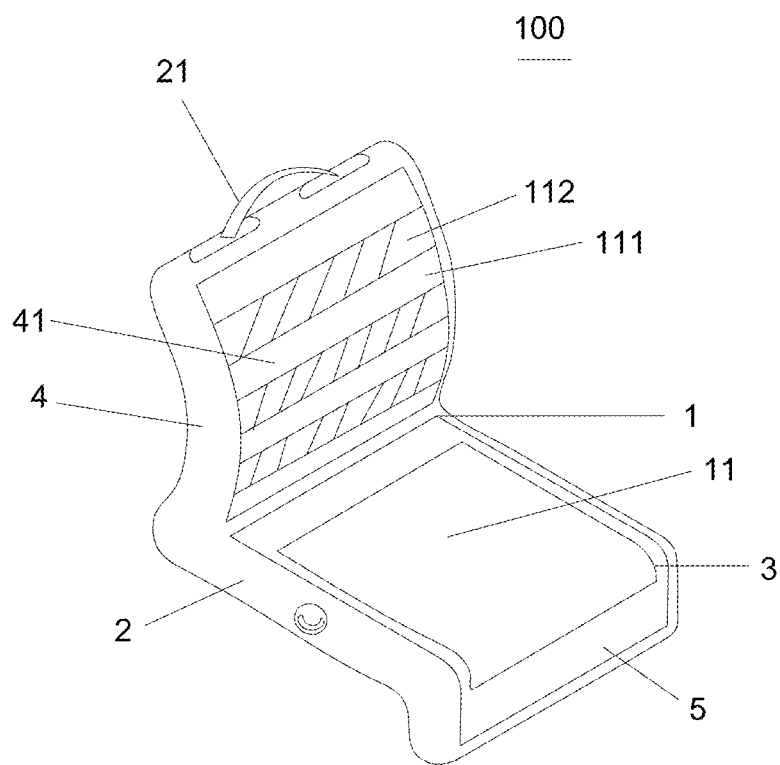
FIG. 2 is a schematic view of an inflatable seat according to some embodiments of the present disclosure.
Figure 3:
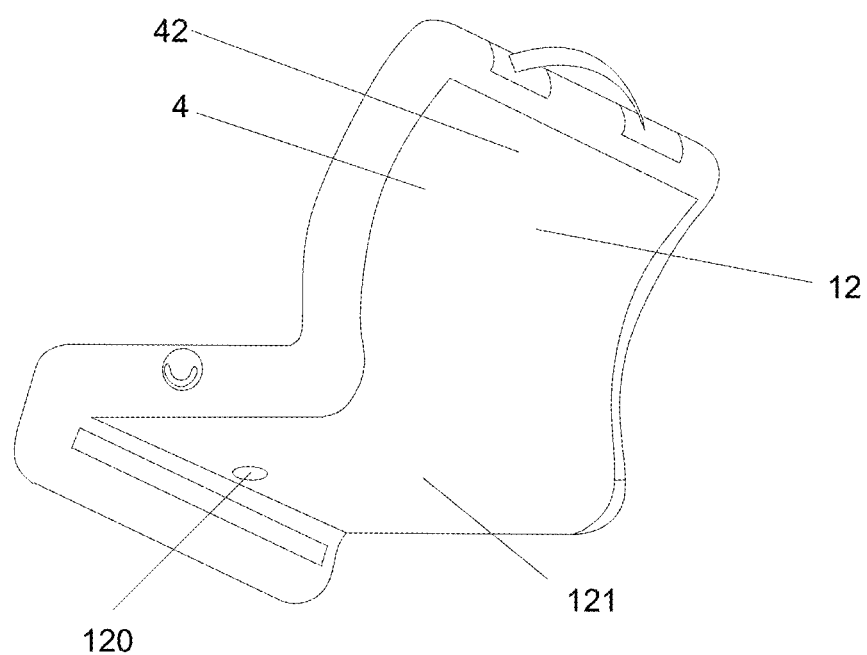
FIG. 3 is a schematic view of the inflatable seat shown in FIG. 2 in another viewing angle.
Figure 4:
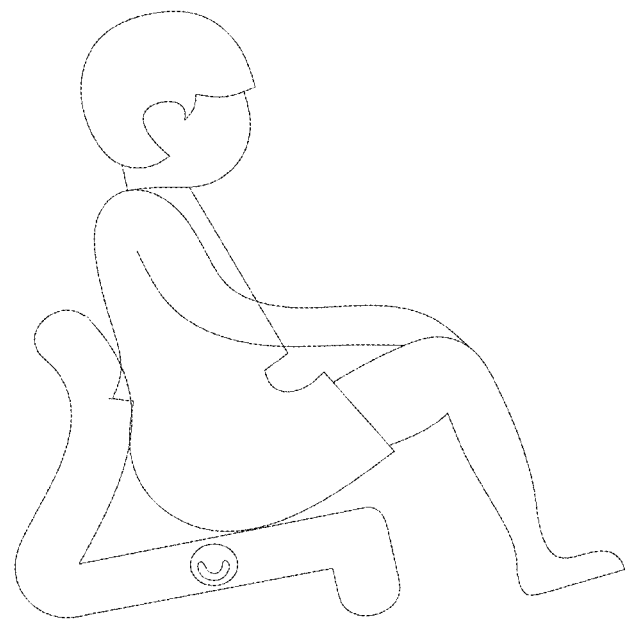
FIG. 4 is a schematic view of a state of use of an inflatable seat according to some embodiments of the present disclosure.

FIG. 1 is a schematic view of a state of use of an inflatable seat in the related art. As shown in FIG. 1, a conventional inflatable seat includes an inflatable cushion and an inflatable backrest as two separate units. Because the inflatable backrest is usually straight and unbent, it is unable to provide support for the human lumbar and back, causing uncomfortableness after seating on the conventional inflatable seat for a long period of time.

As shown in FIGS. 2-5, some embodiments of the present disclosure provide an inflatable seat 100, including a main body 1 made of an inflation brushed cloth and a side wall 2 surrounding the main body; the main body 1 is bent to form a cushion 3 and a backrest 4. The main body 1 includes a first side 11 and a second side 12 opposite to each other, and the side wall 2 connects the first side 11 to the second side 12; the first side 11 includes a first surface 111, and the second side 12 includes a second surface 121; the first surface 111 includes multiple first surface regions, and the first side 11 further includes multiple PVC sandwich mesh fabric regions 112 arranged on the backrest 4, the multiple PVC sandwich mesh fabric regions 112 being each in the shape of an elongated strip and horizontally interspersed with the multiple first surface regions. Specifically, the backrest 4 is arranged with at least three PVC sandwich mesh fabric regions 112, each PVC sandwich mesh fabric region 112 spanning the first side 11 and connected to the side wall 2.

In the embodiments, each of the three PVC sandwich mesh fabric regions 112 has a width of 3 cm. It can be appreciated that, in other embodiments, there may be four or more PVC sandwich mesh fabric regions 112 arranged, and the width of each PVC sandwich mesh fabric region 112 may vary, as long as allowing the backrest 4 to remain curved after inflation.

Since the main body 1 is made of inflation brushed cloth, it has the advantages of light weight, even stress distribution, good air tightness, etc., and is able to adjust the softness and hardness by an inflation degree, which is durable and easy to carry. The PVC sandwich mesh fabric has high tensile strength, high tear strength, and high stiffness, which can provide high resistance to compression and strong toughness.

In some embodiments, the side wall 2 is made of a PVC sandwich mesh fabric, and the second side 12 is arranged with an inflation port 120. Since the inflatable seat 100 has only one air chamber and there is only one inflation port 120, the problem of cumbersome operation of common inflatable furniture may be solved. The inflation port 120 is arranged on a bottom surface of the cushion 3, which may avoid the user from directly contacting the inflation port 120 made of plastic when sitting on the inflatable seat 100, thereby ensuring the usage experience.

In the embodiments, the first side 11 is arranged with a first horizontal stitching line 113 below the PVC sandwich mesh fabric regions 112 and a second horizontal stitching line 114 below the first horizontal stitching line 113; the first horizontal stitching line 113 is connected to the second horizontal stitching line 114, enabling the main body 1 to bend forward, such that the main body 1 above the first horizontal stitching line 113 forms the backrest 4, the main body 1 below the second horizontal stitching 114 forms the cushion 3. It will be appreciated that in other embodiments, the inflatable seat 100 may be made to maintain the bending of the main body 1 in an inflated state by arranged a strap on the side wall 2 on each of both sides. By sewing the first horizontal stitching 113 and the second horizontal stitching 114 with the PVC sandwich mesh fabric with high tensile strength, the main body can bend automatically when the inflatable seat 100 is inflated, which ensures the durability of the inflatable seat 100 and reduces the number of parts, thereby simplifying the steps of production and use of the inflatable seat 100.

In some embodiments, an upper end of the side wall 2 is arranged with a carrying handle 21, which facilitates the user to carry the inflatable seat 100 whether in an inflated state or a deflated state.

Further, the second side 12 is arranged with a third stitching line 123 and a fourth stitching line 124 spaced apart from each other at a position away from the carrying handle 21; the third horizontal stitching line 123 is connected to the fourth horizontal stitching line 124, such that the main body 1 is bent backward to form a supporting leg 5, so as to make the inflatable seat 100 applicable to a variety of different usage scenarios.

The present disclosure provides an inflatable seat, including a main body made of an inflation brushed cloth and a side wall surrounding the main body; where the main body includes a first side and a second side opposite to each other, the side wall connecting the first side and the second side; the first side includes a first surface, and the second side includes a second surface; the main body bends to form a cushion and a backrest; the first surface includes multiple first surface regions, and the first side further includes multiple PVC sandwich mesh fabric regions arranged on the backrest, the PVC sandwich mesh fabric regions being each in the shape of an elongated strip and horizontally interspersed with the multiple first surface regions. As the first surface is partially replaced with the PVC sandwich mesh fabric, the first side will naturally bend when the inflatable seat is in an inflated state, forming the backrest that conforms to the bending arc of the lumbar back region, which is comfortable to sit on and not easy for lumbar spine pain.

In this embodiment, the backrest 4 comprises a first effective inflation layer 41 which is a front layer that will contact the back of the user and a second effective inflation layer 42 which is a rear layer opposite to the first effective inflation layer 41. Both of the two effective inflation layers 41 and 42 are made of inflation brushed cloth.

More specifically, the first effective inflation layer 41 comprises the multiple first surface regions, so that at the first side 11 of the inflatable seat 100, an area of the first effective inflation layer 41 is reduced because the surface of the first side 11 of the inflatable seat is partially replaced by the PVC sandwich mesh fabric region 112, so that the area of the first effective inflation layer 41 is smaller than an area of the second effective inflation layer 42. The area difference between the two effective inflation layers 41 and 42 will cause the backrest 4 to deform when the inflatable seat 100 is inflated, so as to allow the first side 11 of the backest 4 of the inflatable seat 100 to deform to conform to the bending arc of the lumbar back region.

Figure 5:
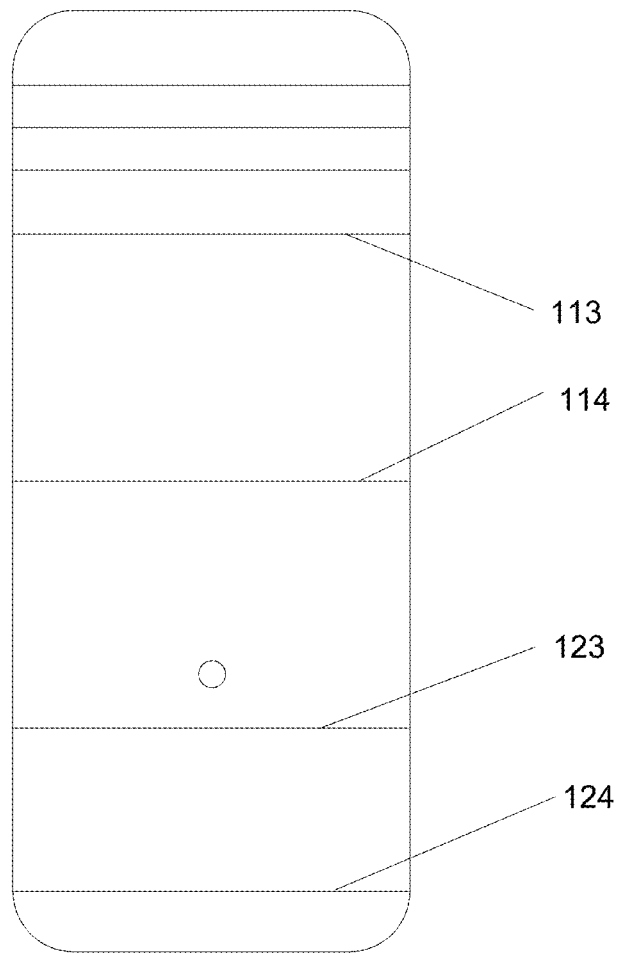
FIG. 5 is a schematic view of a body of an inflatable seat according to some embodiments of the present disclosure
Figure 6:
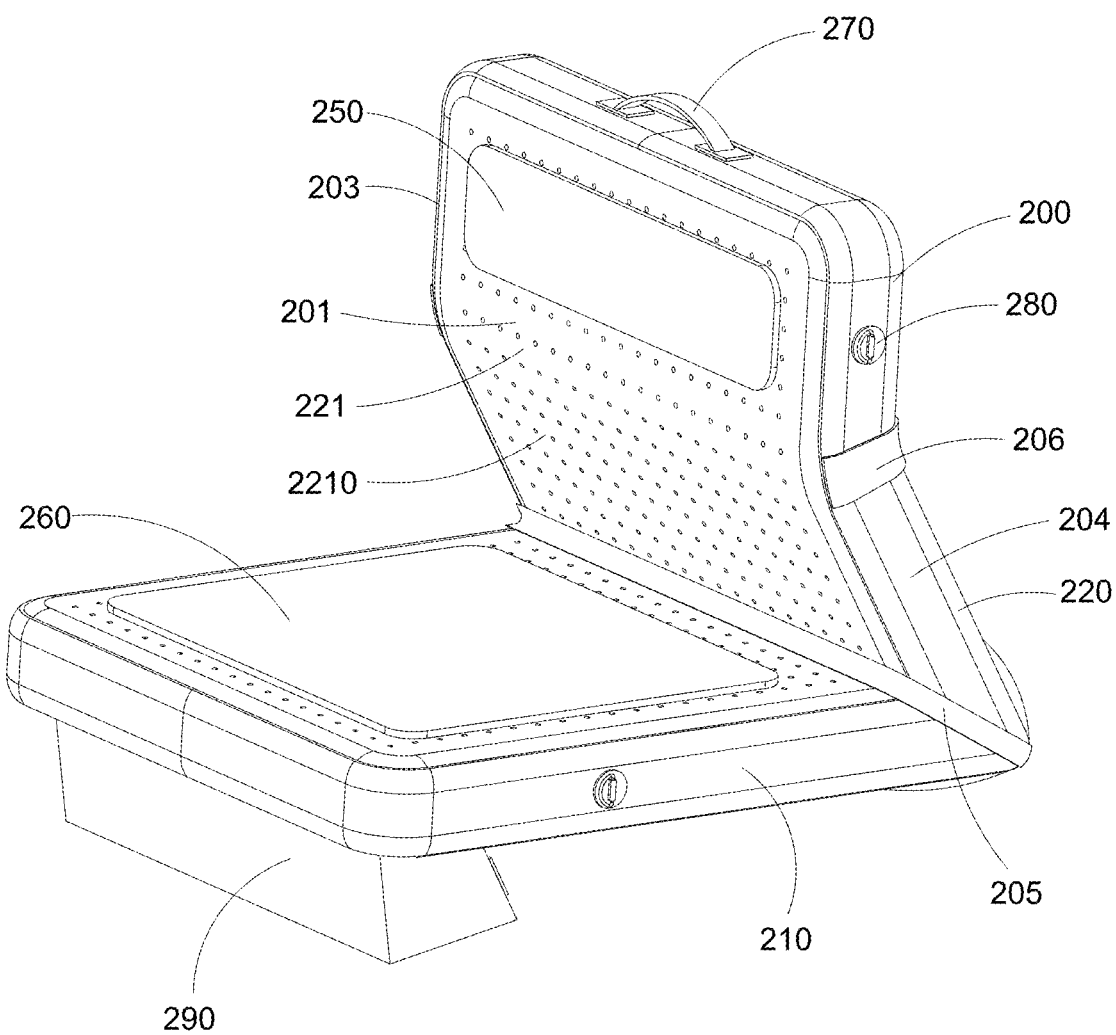
FIG. 6 is a perspective view of an inflatable seat in an inflated state according a preferred embodiment of the present invention.

As shown in FIG. 5, the present disclosure further provides a manufacturing method of an inflatable seat, including the following steps.

S100, providing a main body made of an inflation brushed cloth and conforming to a contour of the inflatable seat; where the main body includes a first side and a second side opposite to each other, the first face including a first surface and the second face including a second surface;

S200, selecting replacement regions on the first side, cutting to remove the first surface in the replacement regions, and sewing a PVC sandwich mesh fabric in the replacement regions to form multiple PVC sandwich fabric regions;

S300, sewing a PVC sandwich mesh fabric around a perimeter of the main body to form a side wall, where the side wall connects the first side and the second side;

S400, selecting a first horizontal stitching line and a second horizontal stitching line below the PVC sandwich mesh fabric regions on the first side, folding the main body such that the first horizontal stitching line and the second horizontal stitching line overlap, and sewing the first horizontal stitching line and the second horizontal stitching line with a PVC sandwich mesh fabric.

Further, the manufacturing method further includes the following steps.

S500, mounting a carrying handle at an upper end of the side wall.

Further, the manufacturing method further includes the following steps.

S600, selecting a third stitching line and a fourth stitching line at a position away from the carrying handle on the second side, folding the main body such that the third horizontal stitching line and the fourth horizontal stitching line overlap, and sewing the third horizontal stitching line and the fourth horizontal stitching line with a PVC sandwich mesh fabric.

The manufacturing method of an inflatable seat provided by the present disclosure includes the steps of: providing a main body made of an inflation brushed cloth and conforming to a contour of the inflatable seat; where the main body includes a first side and a second side opposite to each other, the first face including a first surface and the second face including a second surface; selecting replacement regions on the first side, cutting to remove the first surface in the replacement regions, and sewing a PVC sandwich mesh fabric in the replacement regions to form multiple PVC sandwich fabric regions; sewing a PVC sandwich mesh fabric around a perimeter of the main body to form a side wall, where the side wall connects the first side and the second side, and the side wall is arranged with an inflation port; selecting a first horizontal stitching line and a second horizontal stitching line below the PVC sandwich mesh fabric regions on the first side, folding the main body such that the first horizontal stitching line and the second horizontal stitching line overlap, and sewing the first horizontal stitching line and the second horizontal stitching line with a PVC sandwich mesh fabric. Since the first surface is partially replaced with the PVC sandwich mesh fabric, the first side will naturally bend when the inflatable seat is in an inflated state, forming the backrest that conforms to the bending arc of the lumbar back region, which is comfortable to sit on and not easy for lumbar spine pain.

Referring to FIGS. 6 to 18F of the drawings, an inflatable seat 200 according a preferred embodiment of the present invention is illustrated. The inflatable seat 200 comprises a seat part 210 and a backrest part 220 which is connected to the seat part 210. The seat part 210 and the backrest part 220 can be two independent parts that are assembled with each other. In this embodiment, the backrest part 220 is integrally extended from the seat part 210 and the two parts can be simultaneously inflated, so that the seat part 210 allows the user to sit thereon and the backrest part 220 allows the user to lean his or her back against it.

In this embodiment, the fact that the backrest part 220 is integrally extended from the seat part 210 creates a seamless structure, enhancing the overall stability and durability of the inflatable seat 200. This design reduces the risk of air leaks and weak points that might occur if the seat and backrest were separate components joined together. The unified structure also provides consistent support across both the seat part 210 and the backrest part 220.

The backrest part 220 is connected to the seat part 210 to define an integral inflation chamber 230, the inflatable seat 200 further comprises an air inflation valve 240 which is mounted to one of the backrest part 220 and the seat part 210 for inflating the inflation chamber 230. The simultaneous inflation of both the seat par 210 and the backrest part 220 simplifies the setup process. With a single inflation step, the user can quickly prepare the seat for use without the need to inflate separate sections. This convenience is particularly beneficial in outdoor scenarios where ease of use and time efficiency are important.

The integrated design ensures that both the seat part 210 and the backrest part 220 are evenly inflated, providing consistent support and comfort. The user can sit and lean back without experiencing discrepancies in firmness between the seat part 210 and the backrest part 220, which can occur with separately inflated components. This uniformity contributes to a more comfortable and supportive seating experience.

In addition, the ability to inflate the seat part 210 and the backrest part 220 together as a single unit means the product can be deflated into a compact form for easy transport and storage. This is especially advantageous for the user who need a portable seating solution for activities like paddling, camping, fishing, or other outdoor adventures.

In this embodiment, as shown in FIGS. 6 to 12, the backrest part 220 comprises a first layer 221 which is a back conforming layer for supporting the back of the user and a second layer 222 which is opposite to the first layer 221. When the backrest part 220 is inflated, the first layer 221 comprises a smooth curved surface 2211 having a raised peak position 2212 for conforming to the back of the user, particularly to the waist of the user, so as to provide a support to the waist of the user.

The raised peak position 2212 on the smooth curved surface 2211 is specifically designed to align with and support the user's waist. This targeted support helps to maintain the natural curve of the spine, particularly in the lumbar region, reducing strain and preventing discomfort during prolonged sitting. By conforming closely to the back, the backrest effectively distributes pressure and minimizes the risk of lower back pain.

The smooth curved surface 2211 of the first layer 221 enhances the overall comfort by providing a gentle and even surface that adapts to the contours of the user's back. This ergonomic design ensures that the backrest part 220 fits snugly against the back of the user, offering a more personalized and comfortable seating experience, particularly during activities that require sustained periods of sitting.

The conforming nature of the first layer 221, combined with the raised peak position 2212, helps stabilize the user's posture by keeping the back properly aligned. This feature encourages a more natural and upright sitting position, which can reduce muscle tension and fatigue, especially in the lower back. The stability provided by the backrest part 220 enhances the overall effectiveness of the seat in supporting healthy posture.

The ability of the backrest part 220 to conform to the user's back and maintain its shape over time suggests that it is designed for long-term comfort and durability. The consistent support provided by the raised peak position 2212 ensures that the seat remains comfortable and supportive even with repeated use, increasing its longevity as a reliable seating solution.

Figure 16:
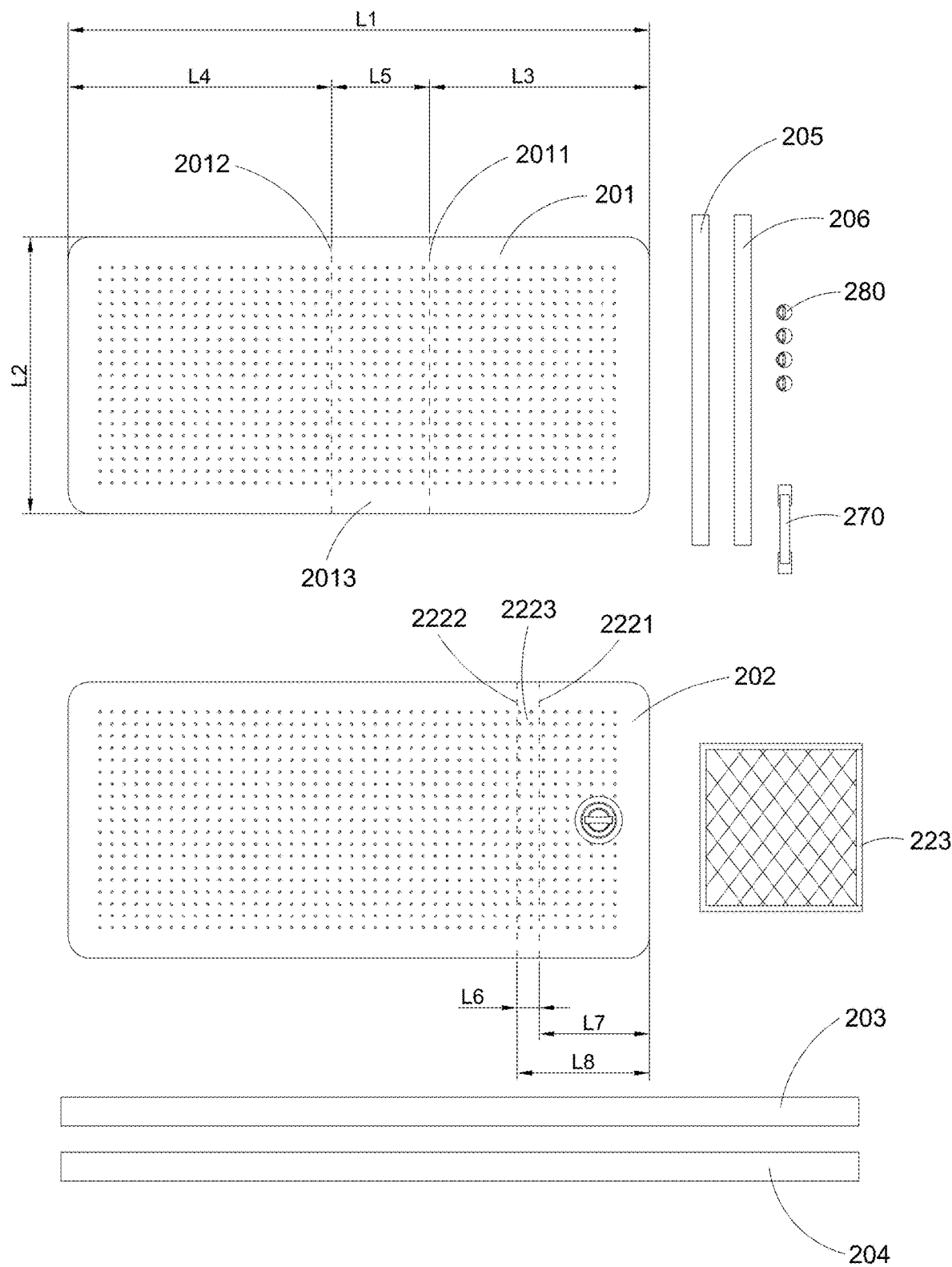
FIG. 16 is a schematic view illustrating the material for preparing the inflatable seat according the above preferred embodiment of the present invention.
Figure 18A:
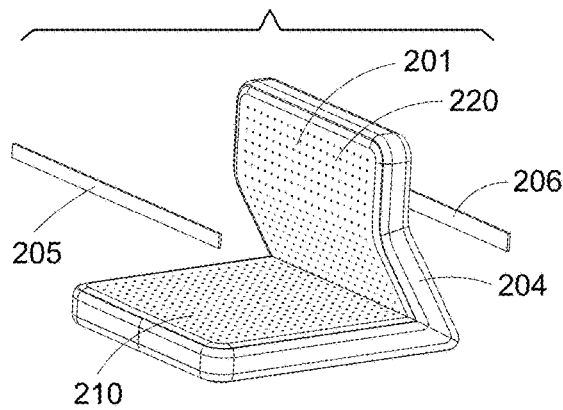
FIGS. 18A, 18B, 18C, 18D, 18E and 18F are schematic view illustrating the rest process of manufacturing the inflatable seat according the above preferred embodiment of the present invention.
Figure 18B:
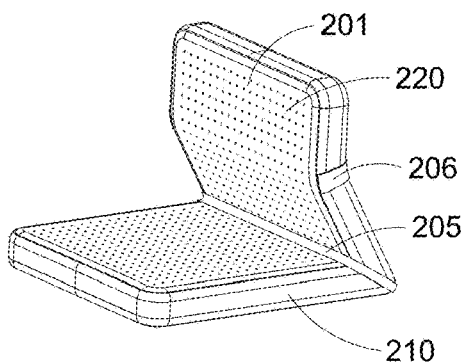
Figure 18D:
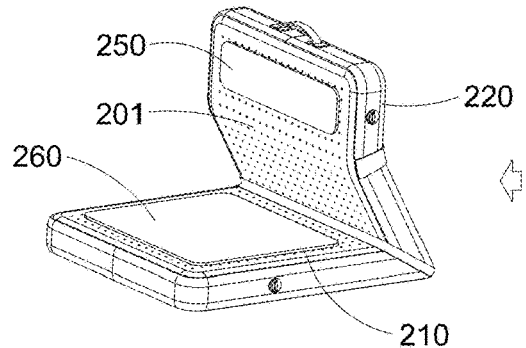
Figure 18C:
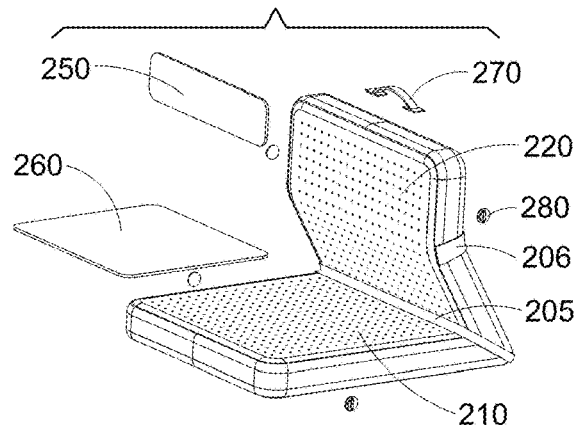
Figure 18E:
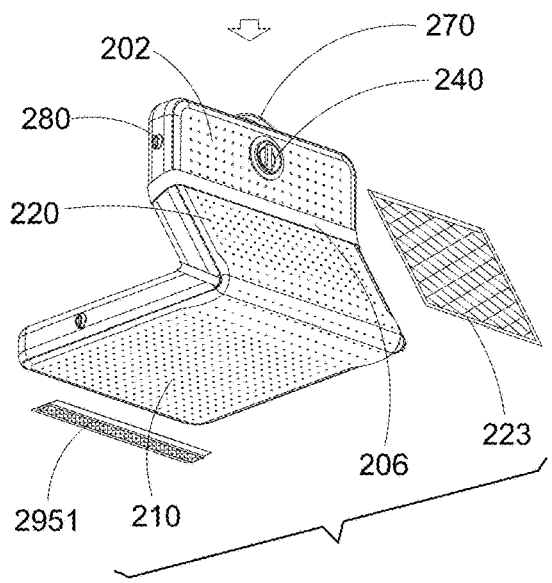
Figure 18F:
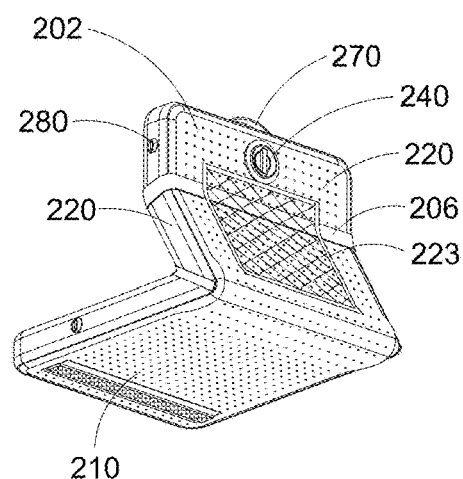

With reference to FIG. 16, the second layer 222 comprises a first folding line 2221, a second folding line 2222, and a folding portion 2223 defined between the first folding line 2221 and the second folding line 2222, the first folding line 2221 is connected to the second folding line 2222 to form a connecting seam 2224, so that the folding portion 2223 is extended into the inflation chamber 230, and thus is received and hidden in the inflation chamber 230, so that when the backrest part 220 is inflated, the position corresponding to the first and second folding lines 2221 and 2222 will inwardly concave towards the direction of the first layer 221, so that the first layer 221 will form the curved surface 2211 with the outwardly protruded raised peak position 2212 for supporting the waist of the user.

The use of the first and second folding lines 2221 and 2222, along with the folding portion 2223, introduces a controlled inward concave effect when the backrest part 220 is inflated. This concavity plays a crucial role in forming the curved surface 2211 of the first layer 221, which then creates the outwardly protruded raised peak position 2212. This structural design ensures that the inflated backrest part 220 maintains its shape and provides consistent, reliable support to the user's waist, enhancing comfort and reducing the likelihood of the backrest deforming over time.

The inward concavity created by the folding lines 2221 and 2222 allows the first layer 221 to mold into a smooth, curved surface 2211 with a strategically positioned raised peak position 2212. This precision in shaping the backrest part 220 ensures that the peak is optimally positioned to support the lumbar region, aligning with the natural curvature of the spine. This precise ergonomic design helps to alleviate pressure on the lower back and improve overall posture during use.

Figure 10:
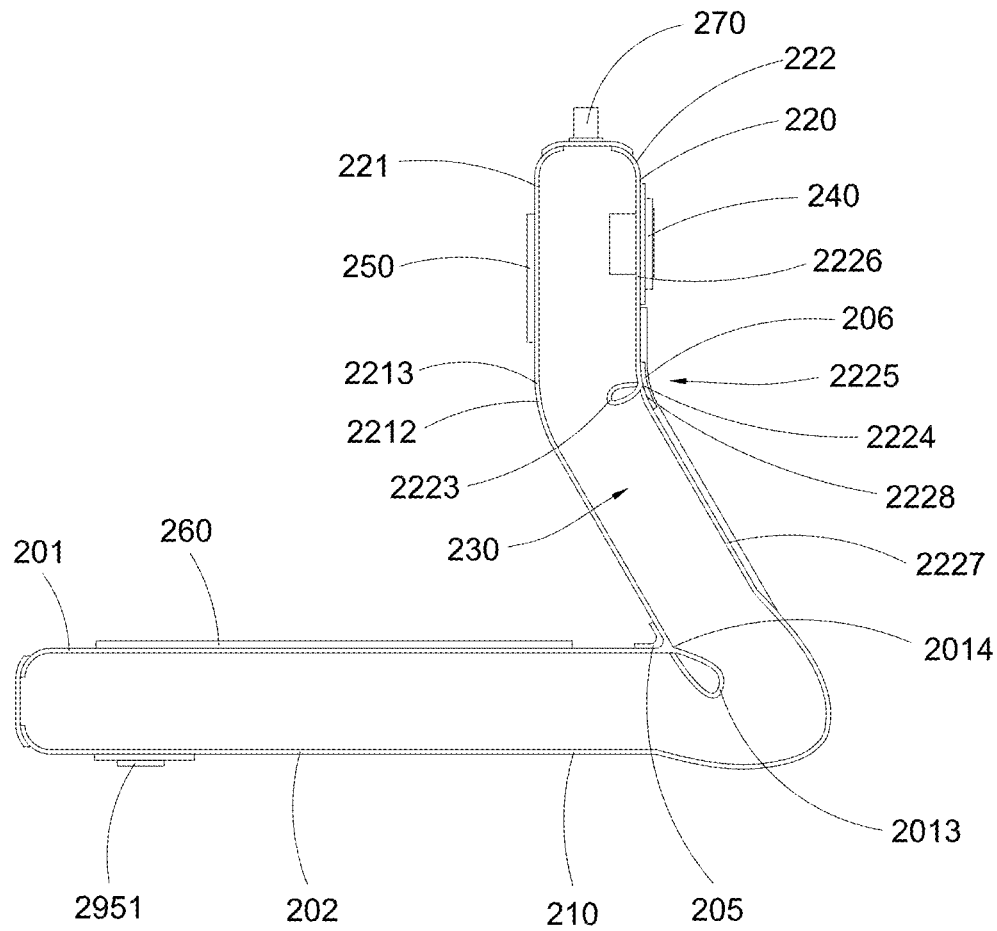
FIG. 10 is a sectional view along line A-A of FIG. 6.

As shown in FIG. 10, the folding portion 2223 is designed to be received and hidden within the inflation chamber 230, so that the internal mechanism not only contributes to a clean and aesthetically pleasing appearance but also ensures that the folding lines 2221 and 2222 do not interfere with the user's comfort or the seat's outward appearance. The hidden nature of the mechanism enhances the product's functionality by maintaining a smooth and uninterrupted surface on the backrest part 22.

The configuration of the folding lines 2221 and 2222 and the folding portion 2223 within the inflation chamber 230 ensures that when the backrest part 220 is inflated, the structural changes necessary to form the supportive curved surface 2211 happen automatically and consistently. This design simplifies the user's experience, as the backrest part 220 automatically adapts to provide optimal support with each inflation, without requiring manual adjustments or additional components.

The ability of the backrest part 220 to form a concave shape inwardly at the rear side, while creating an outwardly protruding peak at the front side, makes the design highly adaptive to different users and varying levels of inflation. Whether the backrest part 220 is fully inflated for maximum support or slightly less inflated for a softer feel, the design ensures that the lumbar support remains effective, providing versatility in comfort.

By ensuring that the backrest part 220 forms a supportive, curved surface 2211 with a raised peak position 2212, the design helps reduce muscle tension in the lower back and prevents discomfort during prolonged sitting. The inward concavity at the folding lines 2221 and 2222 further aids in distributing the user's weight evenly across the backrest part 220, minimizing pressure points and contributing to a more comfortable and relaxing seating experience.

Figure 9:
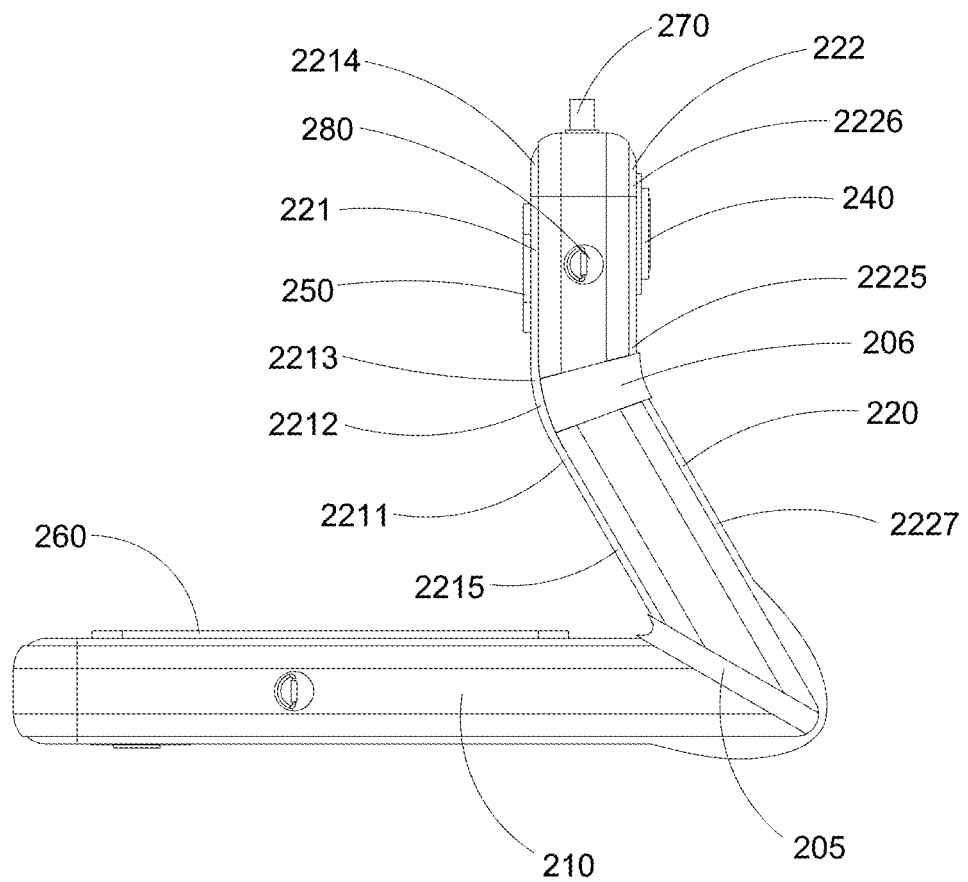
FIG. 9 is a side view of the inflated inflatable seat according the above preferred embodiment of the present invention.

As shown in FIG. 9 and FIG. 10 of the drawings, when the backrest part 220 is inflated, a concave groove 2225 is formed along the surface of the second layer 222, and a protrusion section 2213 is formed at the first layer 221, so as to provide the raised peak position 2212 at a center of the protrusion 2213 for supporting the waist of the user.

In other words, the formation of the concave groove 2225 in the second layer 222 naturally causes the first layer 221 to protrude outward, creating a raised peak position 2212. This peak is strategically positioned to provide focused support to the lumbar region, helping to maintain the natural curvature of the spine. By offering targeted support, this design alleviates pressure on the lower back and reduces the likelihood of discomfort or strain during extended periods of sitting.

The design leverages the mechanical properties of the inflatable material to create an ergonomic feature without the need for additional components. As the backrest part 220 inflates, the interaction between the concave groove 2225 and the protrusion section 2213 ensures that the backrest part 220 automatically adjusts to provide the necessary support. This results in a comfortable and supportive seating experience that adapts to the user's body.

The concave groove 2225 in the second layer 222 adds structural stability to the backrest part 220 by channeling the inflation forces in a way that reinforces the raised peak position 2212 on the first layer 221. The seamless creation of the raised peak position 2212 during inflation simplifies the user experience, as the backrest part 220 automatically conforms to the desired shape and support level without requiring manual adjustments. This convenience is particularly valuable in outdoor settings, where ease of use and quick setup are important.

The concave groove 2225 and resulting protrusion section 2213 are formed through the inflation process, which means the design remains sleek and unobtrusive when the inflatable seat 200 is not in use. This integration of function into the product's design ensures that the backrest part 220 is both aesthetically pleasing and highly functional, enhancing the overall appeal and usability of the inflatable seat 220.

As shown in FIG. 10 of the drawings, the second layer 222 comprises a second upper section 2226, a second lower section 2227, and a transition section 2228 between the first upper section 2226 and the first lower section 22227, the position of the connecting seam 2224 is located in the transition section 2228. and when the inflatable seat 200 is inflated to inflate the backrest part 220, the transition section 2228 is automatically deformed to concave toward the first layer 221 to form the concave groove 2225, the first layer 221 automatically form a first upper section 2214, a first lower section 2215 and the middle protrusion section 2213 between the first upper section 2214 and the first lower section 2215, so that the protrusion section 2213 with a central raised peak position 2212 for supporting the waist. In the inflated state of the backrest part 220, the second upper section 2226 and the second lower section 2227 are respectively inclinedly extended from the transition section 2228, the first upper section 2214 and the first lower section 2215 are respectively inclinedly extended from the protrusion section 2213. This automatic shaping mechanism ensures that the backrest part 220 conforms to the user's body, providing ergonomic support without manual adjustment, which enhances user comfort and reduces setup time.

The deformation of the transition section 2228 into a concave groove 2225 not only contributes to the ergonomic shape but also reinforces the structural integrity of the backrest. The concave groove 2225 acts as a stabilizing feature, ensuring that the backrest part 220 maintains its shape and provides consistent support even under varying pressure conditions.

The inclined extension of the upper and lower sections from both the protrusion and transition sections allows the backrest part 220 to adapt to different user postures and preferences. Whether the user is sitting upright or reclining, the backrest's design accommodates various positions while consistently offering support where it's needed most, particularly in the lumbar region.

In this embodiment, the backrest part 220 comprises a first effective inflation layer 2210 which is a front layer that will contact the back of the user and a second effective inflation layer 2220 which is a rear layer opposite to the first effective inflation layer 2210. Both of the two effective inflation layers 2210 and 2220 are made of inflation brushed cloth.

More specifically, the first effective inflation layer 2210 is the first layer 221, the second effective inflation layer 2220 is reduced because the first folding line 2221 is connected to the second folding line 2222 to form the connecting seam 2224 and allow the folding portion 2223 to be hidden in the inflation chamber 230, so that comparing with the first effective inflation layer 2210, an area difference between the two effective inflation layers 2210 and 2220 is created because the folded folding portion 2223 of the second layer 222, so that when the backrest part 220 is inflated, the position corresponding to the first and second folding lines 2221 and 2222 will inwardly concave towards the direction of the first layer 221, so that the first layer 221 will form the curved surface 2211 with the outwardly protruded raised peak position 2212 for supporting the waist of the user.

In addition, the inflatable seat 200 further comprises a first resilient layer 250 which is attached to the first layer 221 of the backrest part 220 for supporting the back of the user, and a second resilient layer 260 which is attached to the seat part 210 for supporting the butt of the user. The material of the first and second resilient layers 250 and 260 can be any suitable layer, such as EVA (Ethylene-Vinyl Acetate), PU (Polyrethane) foam, PE (Polyethylene) foam, TPE (Thermoplastic Elastomer), PVC (Polyvinyl Chloride) foam, Neoprene, and Silicone foam.

The addition of resilient layers 250 and 260 significantly improves the overall comfort of the inflatable seat 200. These materials are known for their cushioning properties, allowing them to absorb and distribute pressure evenly across the surface. This minimizes discomfort and reduces the risk of pressure points, especially during extended periods of use.

Each of the materials mentioned (EVA, PU, PE, TPE, PVC, Neoprene, and Silicone foam) offers different levels of firmness and flexibility, which can be chosen based on the specific ergonomic needs of the user. For instance, EVA and PU foam provide excellent cushioning, making them ideal for prolonged sitting, while TPE and Silicone foam offer a balance of flexibility and support, ensuring that the backrest part 220 conforms to the natural curvature of the spine.

In addition, materials like EVA, PU foam, and Neoprene are particularly effective at absorbing shocks and impacts. This feature is especially beneficial in outdoor or active scenarios, where the seat may be exposed to rough terrain or sudden movements. The resilient layers help protect the user from these external forces, providing a stable and comfortable seating experience.

The resilient layers work in conjunction with the inflatable structure to provide enhanced stability, ensuring that the user's posture is well-supported. This is particularly important in maintaining spinal alignment and reducing the risk of back strain, especially during prolonged use.

Furthermore, many of these materials, such as EVA and PVC foam, are resistant to water, chemicals, and UV light, making them easy to clean and maintain. This ensures that the inflatable seat remains hygienic and in good condition, even with frequent outdoor use.

As shown in FIGS. 6 to 12 of the drawings, the first resilient layer 250 is provided at a upper position of the first layer 221, so that the first resilient layer 250 will not interfere the formation of the protrusion section 2213 when the backrest part 220 is inflated. In other words, the first resilient layer 250 is attached to the first layer 221 corresponding to an area in the first upper section 2214.

In other words, by placing the first resilient layer 250 on the upper section of the first layer 221 of the backrest part 220, it avoids interference with the formation of the protrusion section 2213 during inflation. This ensures that the central raised peak position 2212, which is crucial for supporting the user's waist, forms correctly and provides targeted lumbar support.

The first resilient layer 250 directly supports the upper back and shoulders. This placement ensures that while the lumbar region is supported by the protrusion section 2213, the upper body receives additional cushioning and stability from the resilient layer 250. This dual-level support system promotes better posture and reduces overall back fatigue during extended periods of use.

The inflatable seat 200 further comprises a handle 270 which is connected to a top of the backrest part 220 for a user to hold thereon to carry the inflatable seat 200, and one or more attaching element 280 which is used for detachably mounting the inflatable seat 200 to the environment. For example, the attaching element 280 may be used for mounting the inflatable seat 200 to an inflatable paddle. As shown in the drawings, the attaching element 280 may be embodied as a D-ring and four D-rings can be provided on the backrest part 220 and the seat part 210.

Figure 7:
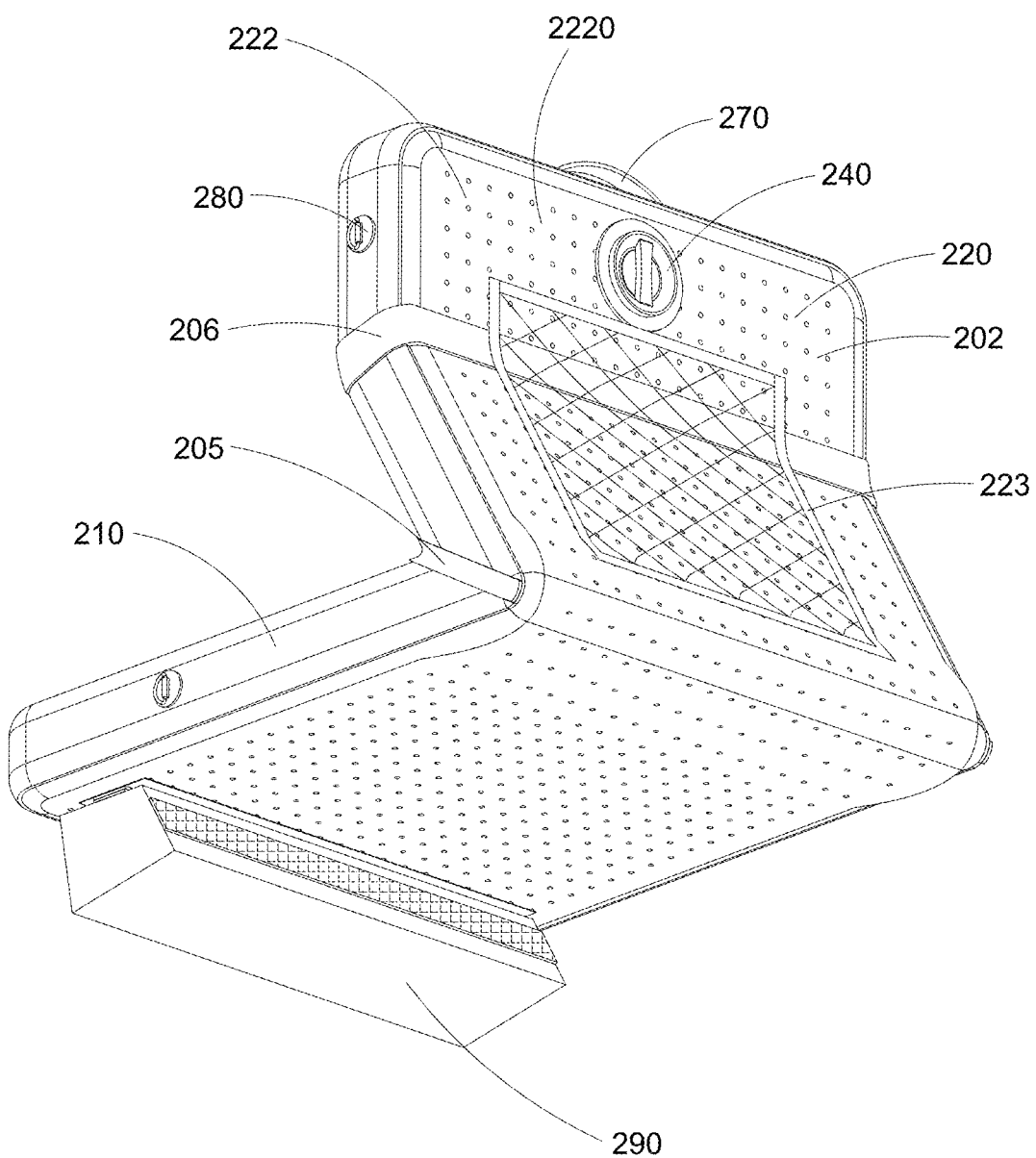
FIG. 7 is another perspective view of the inflated inflatable seat according the above preferred embodiment of the present invention.

As shown in FIG. 7 of the drawings, the backrest part 220 of the inflatable seat 200 further comprises a mesh pocket 223 which is mounted to the second layer 222 of the backrest part 220 for storing personal items of the user. The inflation valve 240 is mounted to the second layer 222 of the backrest part 220 which will not have contact with the human body of the user.

This design ensures that the inflation valve 240 does not interfere with the user's comfort. This is especially important for the inflatable seat 200, where hard or protruding elements could detract from the overall user experience. The location of the inflation valve 240 on the outer rear surface of the backrest part 220 keeps it out of the way, reducing the risk of accidental damage or discomfort during inflation, deflation, or while the seat is in use Both the mesh pocket 223 and the discreet placement of the inflation valve 240 contribute to the sleek and unobtrusive design of the inflatable seat 200. The mesh pocket 223 is functional yet minimalistic, while the hidden inflation valve 240 enhances the overall appearance of the inflatable seat 200 by maintaining a smooth, streamlined surface.

Referring to FIGS. 16 to 18F of the drawings, the inflatable seat 200 comprises a main body which is formed by a first body layer 201, a second body layer 202, a first side layer 203, and a second side layer 204. The first body layer 201 and the second body layer 202 are two layers which are overlappedly aligned with each other, the first side layer 203 and the second side layer 204 are respectively connected to the two sides of the first body layer 201 and the second body layer 202.

Each of the first body layer 201 and the second body layer 202 is an inflation brushed cloth which is made by coating a layer of coating film on each of front and back sides of a three-dimensional woven cloth, and front and back sides of a base cloth of the brushed cloth are each a flat fiber woven cloth. As mentioned above, there are equally spaced long fiber filaments set up between the fiber woven cloths, such that the inflation brushed cloth can be made to maintain the front and back sides in parallel after inflation, and the inflation brushed cloth can be made to obtain a plate-like inflatable structural material after inflation.

Accordingly, the inflation brushed cloth is designed with a specific structure that combines durability, air retention, and a soft, comfortable surface. The key components of its structure include a base layer, a coating layer and a brushed surface layer.

The foundation of the brushed cloth is usually a robust, woven fabric that provides structural integrity. This base layer is typically made from materials like polyester, nylon, or a blend of synthetic fibers. The woven structure ensures the cloth is strong enough to withstand the pressure of inflation and repeated use.

To make the cloth airtight and water-resistant, a coating layer is applied to the back of the base fabric. This coating is often made from materials like TPU (Thermoplastic Polyurethane), PVC (Polyvinyl Chloride), or other polymers that provide an airtight seal and enhance durability. The coating also helps prevent air leakage and increases the material's resistance to wear and tear.

The outer surface of the cloth is mechanically brushed to create a soft, velvety texture. This brushing process raises the fibers on the fabric's surface, creating a plush feel similar to suede or velvet. The brushing not only improves the tactile comfort of the cloth but also adds a non-slip characteristic, making it more practical for use in seating products.

The two body layers 201 and 202 are aligned with each other to form the primary surface areas of the inflatable seat 200. The alignment ensures that the inflatable seat 200 maintains a uniform thickness and consistent air distribution when inflated. Both the first and second body layers 201 and 202 are made from inflation brushed cloth, and thus this choice of material offers several advantages. The inflation brushed cloth provides excellent air retention, ensuring that the inflatable seat 200 remains inflated for extended periods without significant air leakage. The brushed surface of the cloth offers a soft and comfortable feel, which enhances the user's experience, especially during prolonged use. The material is designed to withstand the pressures of inflation and regular use, making the inflatable seat 200 durable and resistant to wear and tear. The brushed finish gives the seat a premium appearance, making it visually appealing in addition to being functional.

The first side layer 203 and the second side layer 204 can be made of any suitable material, such as PE, TPE, PVC and TPU. In this embodiment, each of the first side layer 203 and the second side layer 204 is embodied as an elongated strip which is sewn, adhered or welded to the two body layers 201 and 202. The four attaching elements 280 which are embodied as D-rings are connected to the two side layers 203 and 204.

The two body layers 201 and 202 can be two independent layers which are connected to each other by the two side layers 203 and 204. Alternatively, the two body layers 201 and 202 are formed by an integral body layer, and the integral body layer is folded to form the two body layers 201 and 202.

The two body layers 201 and 202 of this embodiment are folded to form the seat part 210 and the backrest part 220. In other words, a portion of the two body layers 201 and 202 forms the seat part 210 while the rest portion of the two body layers 201 and 202 forms the backrest part 220. Accordingly, the first layer 221 of the backrest part 220 is a part of the first body layer 201, the second layer 222 of the backrest part 220 is a part of the second body layer 202.

The first body layer 201 comprises a first bending line 2011, a second bending line 2012, and a bending portion 2013 between the first bending line 2011 and the second bending line 2012. In this embodiment, the first bending line 2011 and the second bending line 2012 are overlapped and connected with each other to form a bending seam 2014, and the bending portion 2013 is extended into the inflation chamber 230 of the inflatable seat 200, and thus the bending portion 2013 is received and hidden in the inflation chamber 230 of the inflatable seat 200. When the inflatable seat 200 is inflated, the bending seam 2014 will render the inflatable seat 200 to automatically bend the main body to form the seat part 210 and the backrest part 220, the two effective inflation layers 2210 and 2220 are the layers of the backrest part 220 above the bending seam 2014. Alternatively, the bending portion 2013 may be folded at the outer side of the first body layer 201.

In this embodiment, the first bending line 2011 and the second bending line 2012 are overlapped and connected, forming what is referred to as the bending seam 2014. This seam is crucial as it acts as a hinge or pivot point, enabling the inflatable seat 200 to automatically fold or bend at the correct locations during inflation.

More specifically, when air is introduced into the inflatable seat 200, the pressure causes the bending seam 2014 to guide the material to fold in a specific manner, resulting in the main body of the inflatable seat 200 dividing into two distinct parts: the seat part 210 and the backrest part 220.

The integration of bending lines 2011 and 2012 and the bending seam 2014 allows the inflatable seat 200 to naturally assume its intended shape upon inflation. This eliminates the need for manual adjustment or assembly, making the seat more user-friendly.

By automatically forming into the seat part 210 and the backrest part 220, the inflatable seat 200 provides immediate ergonomic support. The seat part 210 offers a stable surface to sit on, while the backrest part 220 provides necessary support for the back, enhancing overall comfort.

The precise placement of the bending lines 2011 and 2012 and the creation of the bending seam 2014 ensure that the inflatable seat 200 maintains its shape and does not collapse or lose form during use. This design feature contributes to the stability and reliability of the inflatable seat 200. The ability of the inflatable seat 200 to automatically take shape upon inflation adds to its convenience, especially in outdoor scenarios where quick and easy setup is desirable. The design also allows the seat to be compactly folded when deflated, making it easy to transport.

Furthermore, the seamless transition between the seat part 210 and the backrest part 220, facilitated by the bending seam 2014, results in a cleaner, more aesthetically pleasing design. The inflatable seat 200 appears as a unified, well-constructed piece rather than a collection of separate components.

The inflatable seat 200 further comprises a first connecting layer 205 which is attached to the first body layer 201 at a position corresponding to the bending seam 2014, so as to fix the first bending line 2011 with the second bending line 2012. The first connecting layer 205, such as a PVC strip, is sewn, stitched, welded, or adhered on the first body layer 201, so as to connect the two bending lines 2011 and 2012 which are preferred to be embodied as two horizontal lines, and thus the bending seam 2014 formed by connecting the two bending lines 2011 and 2012 is hidden under the first connecting layer 205.

The additional support provided by the first connecting layer 205 significantly extends the lifespan of the inflatable seat 200, ensuring that the bending seam 2014 remains secure and functional over time. By hiding the bending seam 2014 under the first connecting layer 205, the inflatable seat 200 maintains a clean and seamless appearance, which is more appealing to the user. The secure attachment of the bending lines 2011 and 2012 prevents any unwanted movement or misalignment, allowing the inflatable seat 200 to maintain its intended shape and function reliably. The option to sew, weld, or adhere the first connecting layer 205 provides flexibility in the manufacturing process, allowing for the use of different techniques based on production requirements and material compatibility.

A part of the second body layer 202 form the second layer 222 of the backrest part 220, and the second body layer 202 comprises the first folding line 2221, the second folding line 2222, and the folding portion 2223, the first folding line 2221 and the second folding line 2222 are overlapped with each other and the connecting seam 2224 is formed to connect the first folding line 2221 with the second folding line 2222 to hide the folding portion 2223 in the inflation chamber 230 of the inflatable seat 200. Alternatively, the folding portion 2223 may be folded at the outer side of the second layer 222 of the backrest part 220. In other words, the folding portion 2223 may not be embedded into the inflation chamber 230 of the inflatable seat 200.

When the inflatable seat 200 is inflated, the second body layer 202 will deform to inwardly concave toward the first layer 221 of the backrest part 220 and result in the formation of the protrusion section 2213 of the first layer 221 of the backrest part 220.

In other words, upon inflation, the second body layer 202 undergoes deformation, specifically an inward concave movement toward the first layer 221 of the backrest part 220. This concave deformation is a controlled response to the air pressure within the inflation chamber 230. This inward concaving leads to the automatic formation of the protrusion section 2213 on the first layer 221 of the backrest part 220. The protrusion section 2213, with its central raised peak position 2212, is specifically designed to support the user's waist, providing ergonomic comfort.

The automatic formation of the protrusion section 2213 ensures that the inflatable seat 200 provides targeted support to the user's waist, enhancing comfort during use. This ergonomic feature is particularly beneficial in outdoor settings where prolonged sitting may cause fatigue. The precise design of the protrusion section 2213 ensures that it conforms to the natural curvature of the user's back, offering a more tailored and supportive seating experience.

The design cleverly hides the folding portion 2223 within the inflation chamber 230, resulting in a cleaner, smoother external appearance. The absence of visible seams or folds on the outside of the seat contributes to a more polished and visually appealing product. The seamless appearance of the backrest part 220 and the seat part 210 enhances the overall aesthetic of the inflatable seat 200, making it more attractive to consumers who value both function and design.

The inflatable seat 200 further comprises a second connecting layer 206 which is attached to the second body layer 202 at a position corresponding to the connecting seam 2224, so as to fix the first folding line 2221 with the second folding line 2222. The second connecting layer 206, such as a PVC strip, is sewn, stitched, welded, or adhered on the second body layer 201, so as to connect the two folding lines 2221 and 2222 which are preferred to be embodied as two horizontal lines, and thus the connecting seam 2224 formed by connecting the two folding lines 2221 and 2222 is hidden under the second connecting layer 206.

The addition of the second connecting layer 206 significantly enhances the structural integrity of the inflatable seat 200. By securely fixing the folding lines 2221 and 2222 together, the design ensures that the inflatable seat 200 retains its intended shape and functionality, even after prolonged use.

This second connecting layer 206 acts as a reinforcement, distributing stress more evenly across the connection points, reducing the likelihood of material fatigue or failure at these critical junctures. The use of a durable material such as PVC for the second connecting layer 206 contributes to the overall longevity of the inflatable seat 200. The welded or adhered connection methods offer a strong, long-lasting bond, ensuring that the inflatable seat 200 maintains its integrity even after multiple inflation and deflation cycles.

Concealing the connecting seam 2224 beneath the second connecting layer 206 enhances the visual appeal of the seat by maintaining a clean, uninterrupted surface. This is particularly important for products intended for consumer use, where appearance plays a significant role in marketability. The hidden seam also reduces the risk of accidental snagging or tearing, which could occur if the seam were exposed. This protective feature adds to the seat's overall durability.

The ability to sew, stitch, weld, or adhere the second connecting layer 206 offers versatility in the manufacturing process. This allows for customization based on the specific materials used or the intended use of the inflatable seat 200, providing flexibility in production.

Figure 8A:
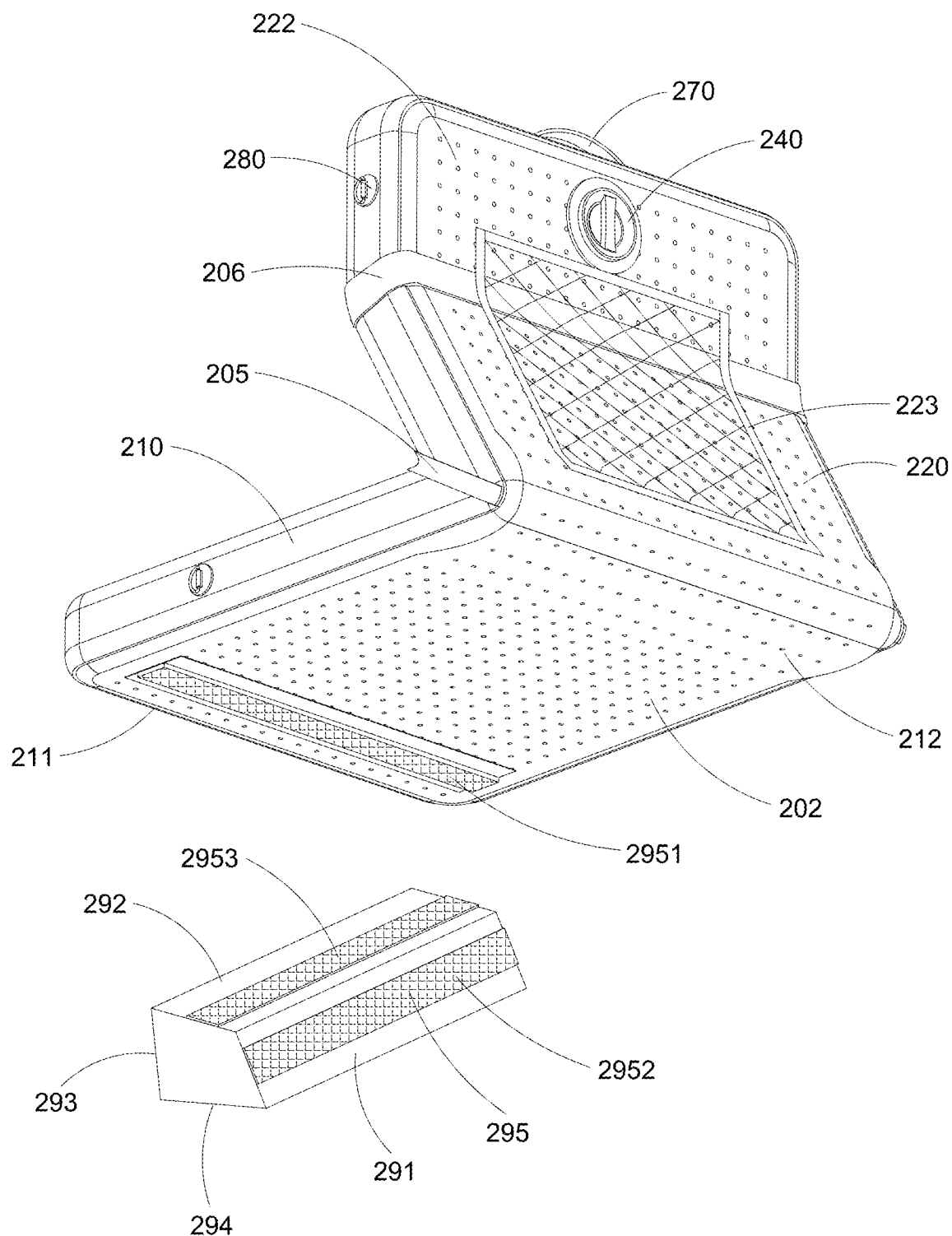
FIG. 8A is another perspective view of the inflated inflatable seat according the above preferred embodiment of the present invention, wherein a support bar is detached from a seat part of the inflatable seat.

As shown in FIGS. 7 and 8A, the inflatable seat 200 further comprises a support bar 290 which is arranged to be placed under the seat part 210 to support the seat part 210, so as to adjust the position of the protrusion section 2213 of the first layer 221 of the backrest part 210 when the inflatable seat 200 is inflated, so that the supporting position to the waist of the user can be adjusted.

The support bar 290 can be strategically positioned under the seat part 210 to modify the position of the protrusion section 2213 on the first layer 221 of the backrest part 220. This feature allows the user to adjust the protrusion to align with their specific waist position, providing personalized lumbar support. This adjustability is crucial for ensuring that users of different body types or heights receive adequate support, reducing the risk of discomfort or strain during extended use.

By enabling the adjustment of the protrusion section 2213, the support bar 290 ensures that the inflatable seat 200 can provide optimal ergonomic support. This is particularly beneficial for the user who require specific positioning of lumbar support to maintain a comfortable and healthy posture. The ability to fine-tune the support position of the protrusion section 2213 of the backrest part 220 enhances the overall comfort of the inflatable sea 200t, making it suitable for long periods of sitting, whether during camping, sports, or other outdoor activities.

The support bar 290 can be made of any suitable material that is rigid enough to provide the support to the seat part 210. For example, the support bar 290 can be made of reinforced PVC, Thermoplastic Elastomer, or high-density Polyethylene, so that the support bar 290 adds to the functionality of the inflatable seat 200 by allowing for easy adjustment of the support features of the inflatable seat 200. This makes the inflatable seat 200 more versatile, as it can be adapted to suit different users or activities.

In this embodiment, the support bar 290 comprises a first inclined support surface 291, a second inclined support surface 292, a third flat base surface 293 and a fourth flat base surface 294. The first inclined support surface 291 and the second inclined support surface 292 are respectively arranged for supporting the seat part 210 to allow two different positions of the protrusion section 2213 of the backrest part 220 of the inflated inflatable seat 200 for supporting the waist of the user at two different states.

Figure 11:
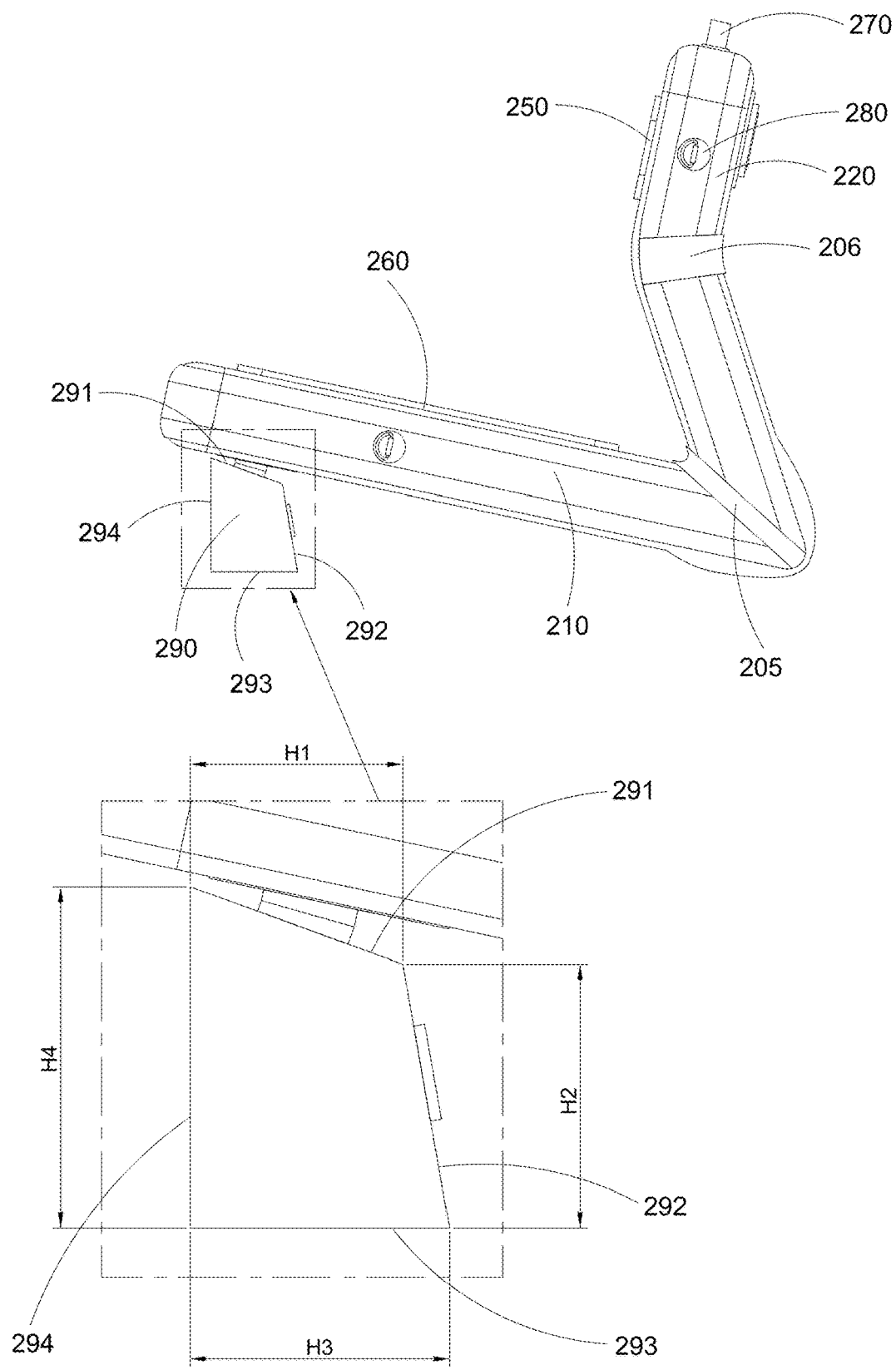
FIG. 11 is a side view illustrating the seat part of the inflated inflatable seat being supported on a first inclined support surface of the support bar according the above preferred embodiment of the present invention.
Figure 14:
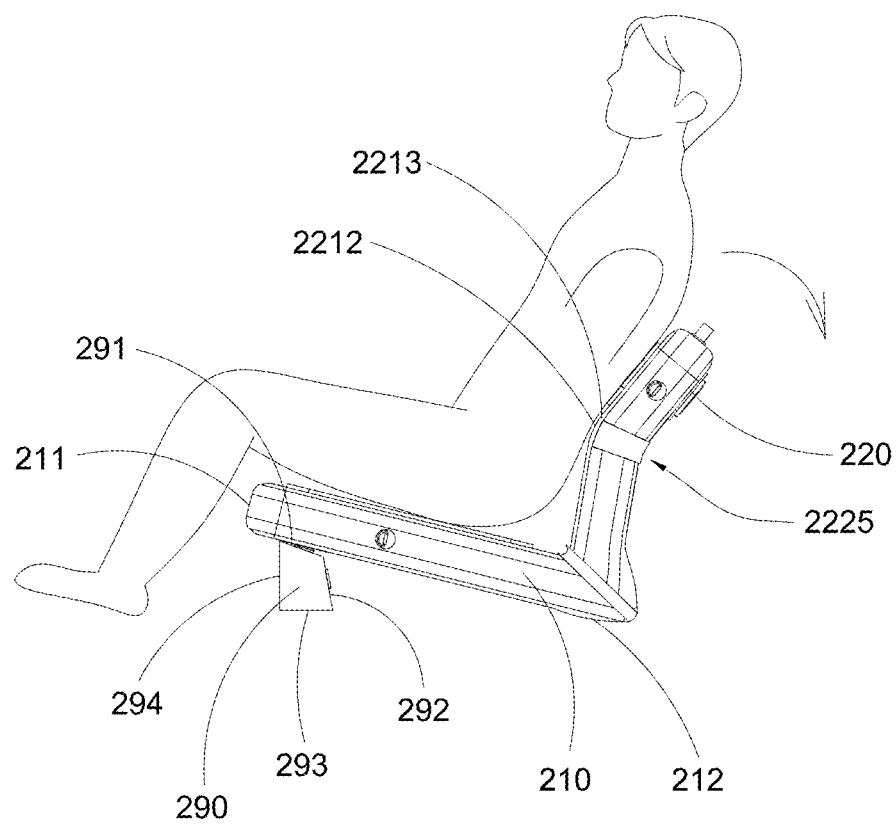
FIG. 14 is a schematic view illustrating the inflated inflatable seat being used for supporting a user according the above preferred embodiment of the present invention, wherein the seat part of the inflated inflatable seat is supported on the first inclined support surface of the support bar.

More specifically, with referring to FIG. 11 and FIG. 14 of the drawings, when the third flat base surface 293, which is opposite to the first inclined support surface 291, is placed on the environment surface, the first inclined support surface 291 with a first inclination angle with respect to the environment surface can be configured to support a distal end portion 211 of the seat part 210 which is away from a proximal end portion 212 which is adjacent to the transition area between the backrest part 220 and the seat part 210, so that the protrusion section 2213 with the central raised peak position 2212 can be arranged at a first position for supporting the waist of the user when the inflatable seat 200 is inflated.

Figure 12:
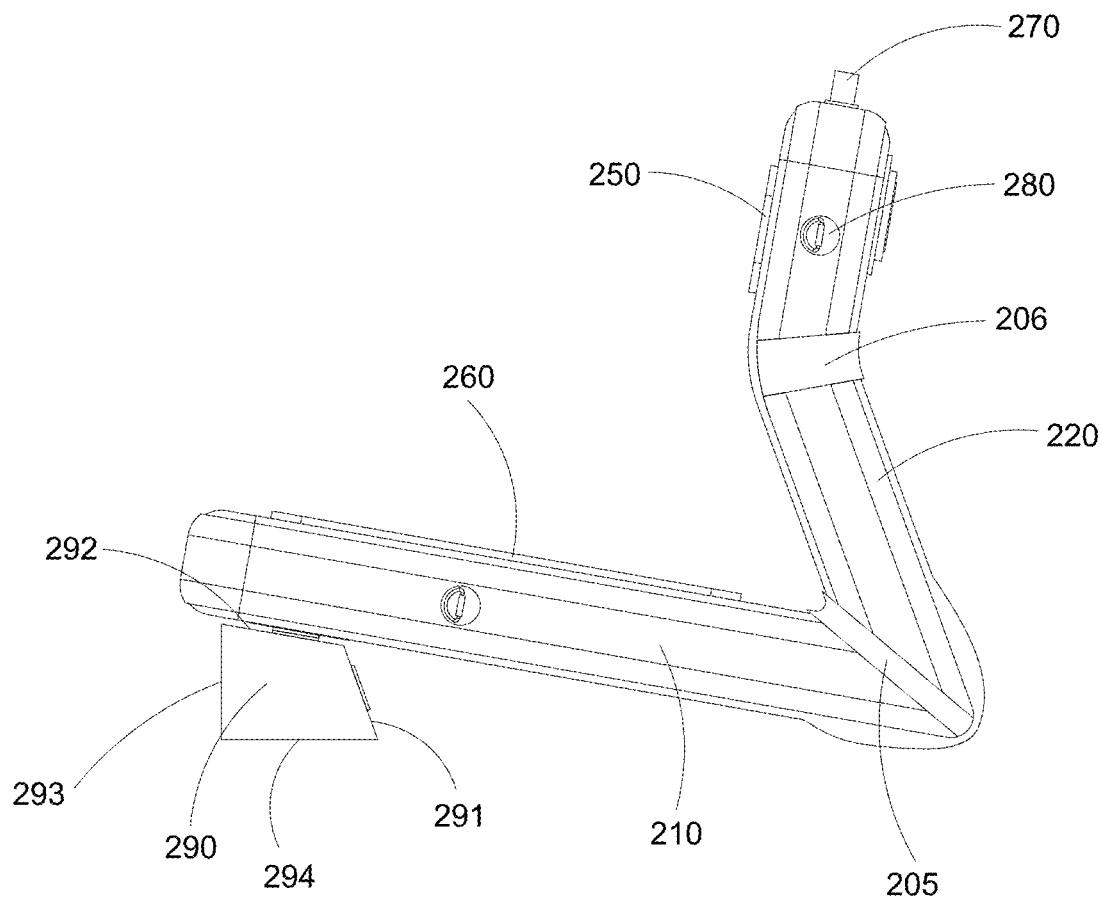
FIG. 12 is a side view illustrating the seat part of the inflated inflatable seat being supported on a second inclined support surface of the support bar according the above preferred embodiment of the present invention.
Figure 15:
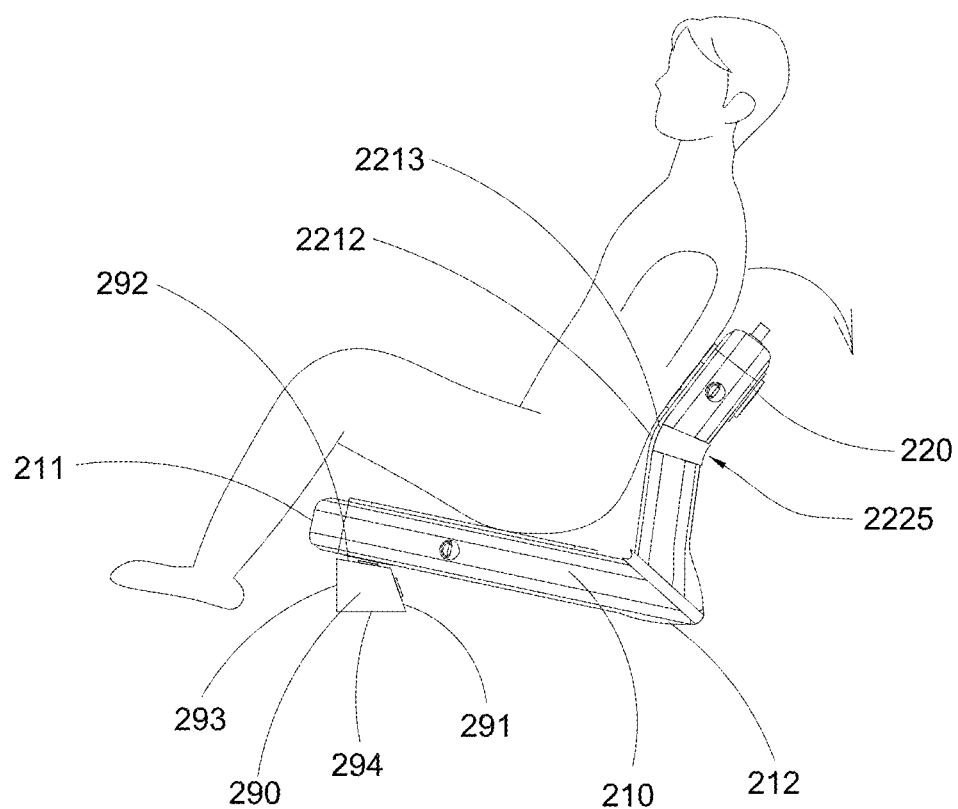
FIG. 15 is a schematic view illustrating the inflated inflatable seat being used for supporting a user according the above preferred embodiment of the present invention, wherein the seat part of the inflated inflatable seat is supported on the second inclined support surface of the support bar.

With referring to FIG. 12 and FIG. 15 of the drawings, when the fourth flat base surface 294, which is opposite to the second inclined support surface 292, is placed on the environment surface, the second inclined support surface 292 with a second inclination angle with respect to the environment surface can be configured to support the distal end portion 211 of the seat part 210, so that the protrusion section 2213 with the central raised peak position 2212 can be arranged at a second position different from the above first position for supporting the waist of the user when the inflatable seat 200 is inflated.

In this embodiment, the support bar 290 features two inclined support surfaces, the first inclined support surface 291 and the second inclined support surface 292. These surfaces allow the seat part 210 to be supported at different angles, effectively enabling the adjustment protrusion section 2213 of the backrest part 220 to two distinct states. This versatility allows users to customize the level of support provided to their waist, enhancing comfort based on personal preference or specific needs.

The two different inclination angles provided by the first inclined support surface 291 and the second inclined support surface 292 allow for ergonomic adjustments. By simply flipping the support bar 290 to place either the third flat base surface 293 or the fourth flat base surface 294 on the environment surface, the user can achieve a customized seating experience. This design ensures that the inflatable seat 200 can adapt to various body types and sitting postures, providing targeted support where it is most needed.

The flat base surfaces (third flat base surface 293 and fourth flat base surface 294) offer a stable foundation for the support bar, ensuring that it remains securely in place on the environment surface. This stability is critical for maintaining the desired positioning of the protrusion section 2213, preventing unintended shifts that could compromise the user's comfort or posture.

The support bar 290 is designed to be effective on various surfaces, making it suitable for diverse outdoor environments such as paddling boards, camping grounds, beaches, or even uneven terrains. The ability to adjust the support bar's orientation to achieve different inclination angles allows the inflatable seat 200 to maintain its ergonomic benefits regardless of the surface it is placed on.

The design of the support bar 290 is intuitive, requiring minimal effort from the user to adjust the seat's support configuration. This ease of use is particularly advantageous in outdoor settings, where convenience and quick adjustments are often necessary. The user can easily reposition the support bar 290 to switch between the two available positions without needing additional tools or assistance.

The primary function of the support bar 290 is to allow precise adjustment of the protrusion section 2213 of the backrest part 220, which is designed to conform to and support the user's waist. By providing two distinct positioning options, the support bar 290 ensures that user can find the most comfortable and supportive configuration, reducing strain on the lower back and enhancing overall comfort during prolonged use.

Figure 13A:
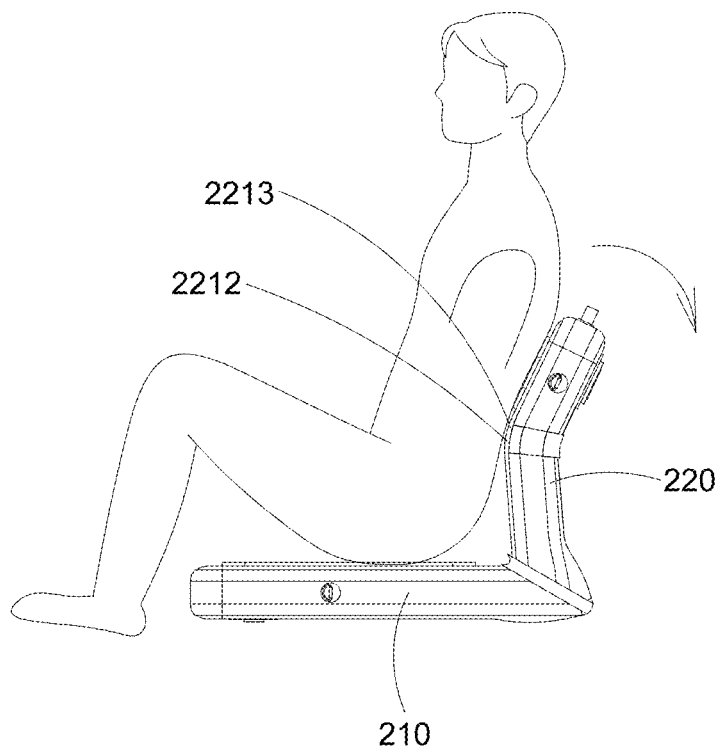
FIG. 13A is a schematic view illustrating the inflated inflatable seat being used for supporting a user according the above preferred embodiment of the present invention.
Figure 13B:
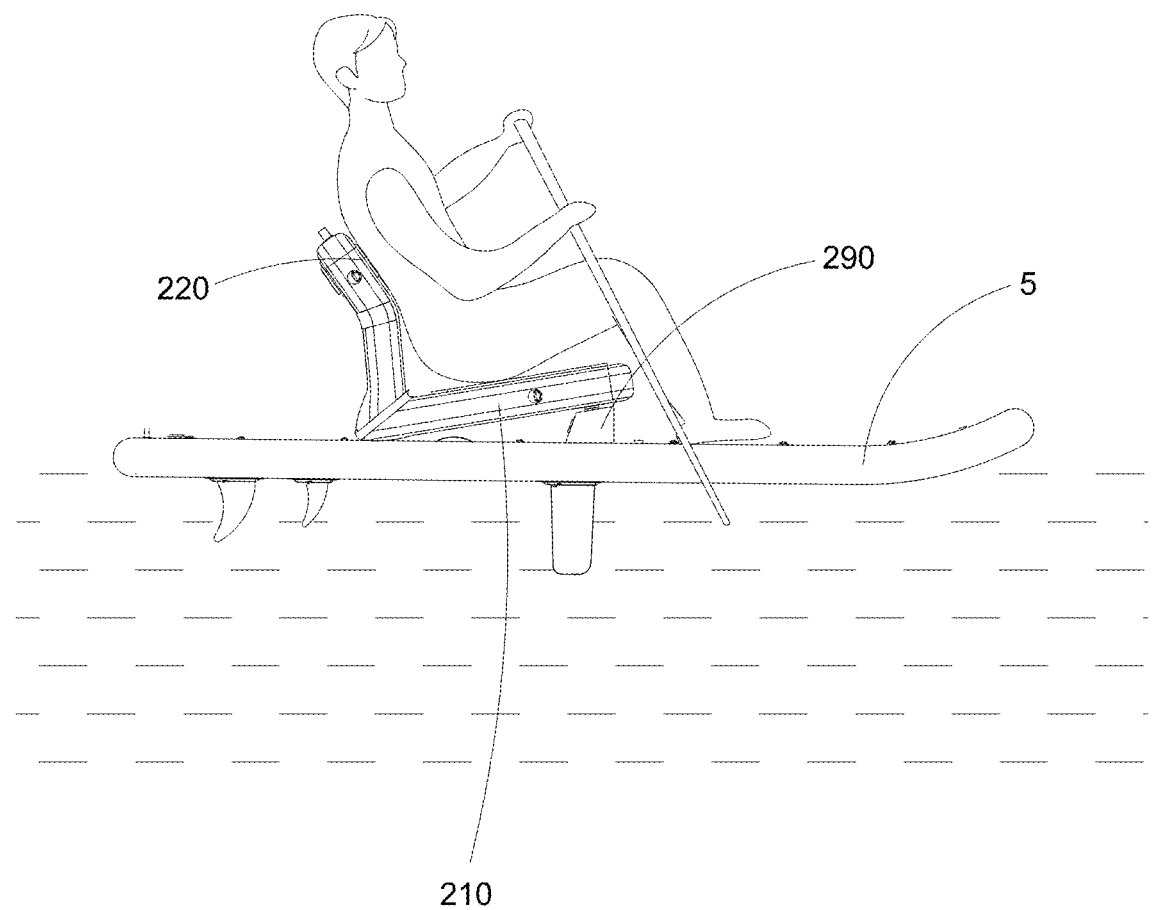
FIG. 13B is a schematic view illustrating the inflated inflatable seat being used for supporting the user on a paddle board according the above preferred embodiment of the present invention.

As shown in FIG. 13A, when the support bar 290 is not used, the seat part 210 can be placed on the environment surface for the user to sit thereon. As shown in FIG. 13B, the inflatable seat 200 of this embodiment can be used on an inflatable paddle board 5, so that it enhances the user's comfort during prolonged use of the inflatable paddle board 5 by providing adjustable support to the waist.

In this embodiment, the support bar 290 is configured to be detachable mounted to a bottom of seat part 210. For example, a connecting means 295 such as a Velcro means is used to detachably mount the support bar 290 to the seat part 210. More specifically, the Velcro means comprises a loop layer 2951 formed on the second body layer 202 corresponding to the bottom of the seat part 210, a first hook layer 2952 attached on the first inclined support surface 291 for detachably coupling with the loop layer 2951, a second hook layer 2953 attached on the second inclined support surface 292 for detachably coupling with the loop layer 2951.

Accordingly, the loop layer 2951 of the Velcro means is formed with soft, fibrous loops. The hook layers 2952 and 2953 of the Velcro means is characterized by tiny, stiff hooks that protrude from its base surface, and these hooks are designed to engage with the softer loops on the loop layer 2951. Alternatively, two loop layers 2951 are fixed to the two inclined support surfaces 291 and 292 while a hook layer is formed on the bottom of the seat layer 210.

The support bar 290 is designed to be easily mounted or removed from the bottom of the seat part 210, thanks to the Velcro means comprising the loop layer 2951 and hook layers 2952 and 2953. This design allows users to quickly attach or detach the support bar without the need for tools or complicated mechanisms, making the inflatable seat 200 more versatile and user-friendly.

Alternatively, the connecting means can be any other suitable detachably coupling means such as magnetically coupling means, snap fasteners, screw fasteners, hook-and-eye fasteners, clip fasteners, buckle fasteners and screw fasteners.

Figure 8B:
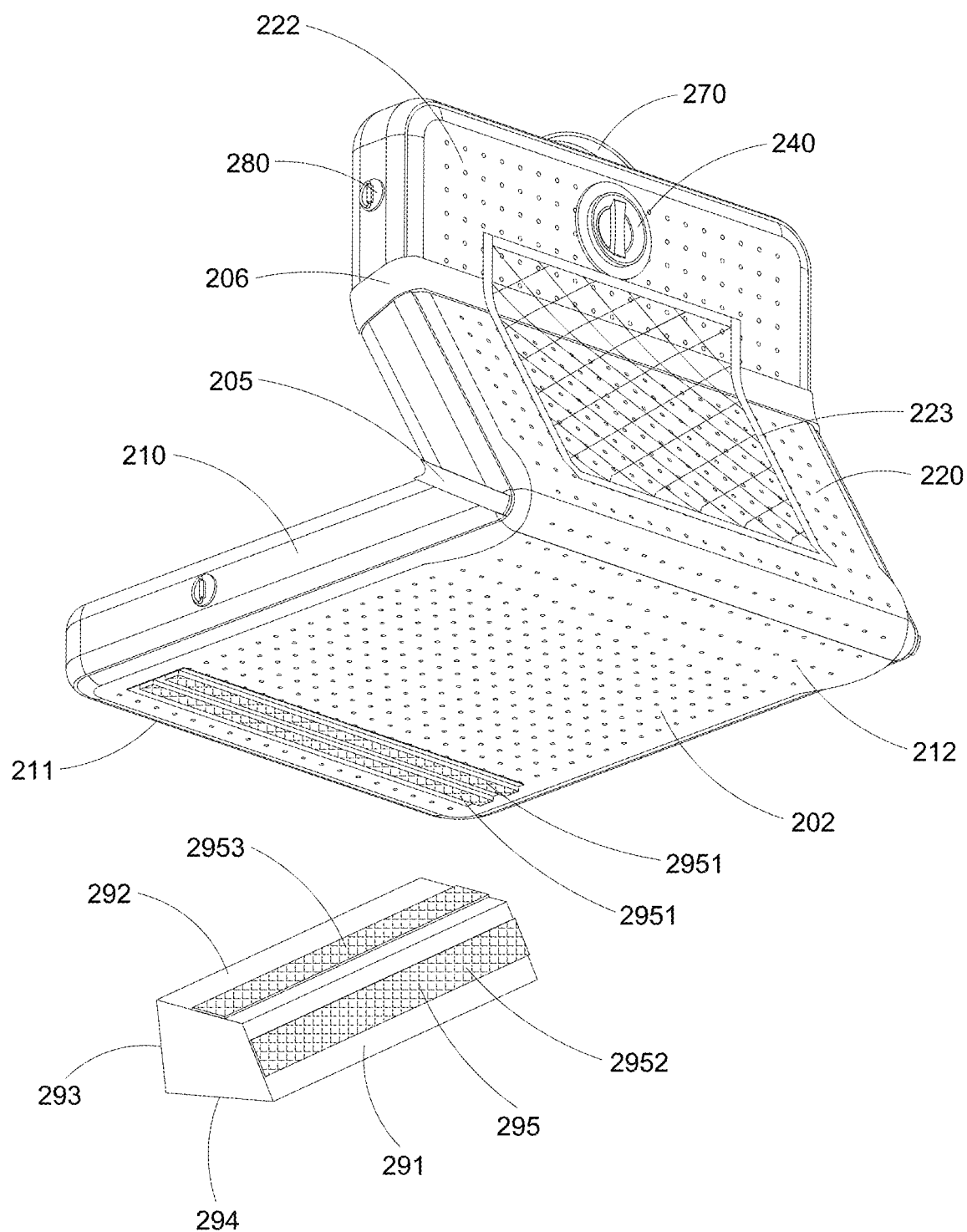
FIG. 8B is another perspective view of the inflated inflatable seat according to an alternative mode of the above preferred embodiment of the present invention.

Alternatively, as shown in FIG. 8B, the support bar 290 may be embodied to comprises two loop layers 2951 on the bottom of the seat part 210, the support bar 290 is provided with a hook layer which can be selectively attached to one of the two loop layers 2951, so as to adjust the position of the protrusion section 2213 of the backrest part 220 when the inflatable seat 200 is inflated.

As s typical example of this embodiment, as shown in FIG. 11 of the drawings, a height H1 of the first inclined support surface is 50 mm, a height H2 of the second inclined support surface is 70 mm, a height H3 of the third flat base surface is 60 mm while a height H4 of the fourth flat base surface is 80 mm.

As shown in FIG. 16 of the drawings, a length L1 of each of the first body layer 201 and the second body layer 202 is 1020 mm, a width L2 of each of the first body layer 201 and the second body layer 202 is 450 mm, a length L3 of the backrest part 220 is 335 mm, a length LA of the seat part 210 is 405 mm, a length L5 of the bending portion 2013 is 280 mm, a length L6 of the folding portion 2223 is 90 mm, a distance L7 of the first folding line 2221 away from a top edge of the second layer 222 is 155 mm, a distance L8 of the second folding line 2222 away from the top edge of the second layer 222 is 245 mm.

Referring to FIGS. 16 to 18F of the drawings, a method for manufacturing the inflatable seat 200 according to the above preferred embodiment of the present invention is illustrated. The manufacturing method comprises a step of preparing the main body comprising the seat part 210 and the backrest part 220, a step of forming the connecting seam 2224 and a step of forming the bending seam 2014.

In the step of preparing the main body, the first body layer 201 is overlapped with the second body layer 202, and the first side layer 203 and the second side layer 204 are connected to two sides of the two body layers 201 and 202, so as to form the main body having the inflation chamber 230.

In the step of forming the connecting seam 2224, the first folding line 2221 is overlapped and connected with the second holding line 2222 of the second body layer 202 to form the connecting seam 2224, so as to hide the folding portion 2223 into the inflation chamber 230. In addition, a second connecting layer 206 can be applied to the second body layer 202 to fix the connecting seam 2224. The first folding line 2221 can be sewn, stitched, welded, or glued to the second holding line 2222, the second connecting layer 206 can be sewn, stitched, welded, or glued to the second body layer 202 and the connecting seam 2224.

In the step of forming the bending seam 2014, the first bending line 2011 is overlapped and connected with the second bending line 2012 of the first body layer 201 to form the bending seam 2014, so as to hide the bending portion 2013 into the inflation chamber 230. In addition, a first connecting layer 205 can be applied to the first body layer 201 to fix the bending seam 2014. The first bending line 2011 can be sewn, stitched, welded, or glued to the second bending line 2012, the first connecting layer 205 can be sewn, stitched, welded, or glued to the first body layer 201 and the bending seam 2014.

Accordingly, when the inflatable seat 200 is inflated, the first body layer 201 is deformed along the bending seam 2014 so as to automatically form the backrest part 220 and the seat part 210, the second body layer 202 is deformed along the folding seam 2224, so as to automatically bend the backrest part 220 to form the concave groove 2225 at the rear side of the backrest part 220 and the protrusion section 2213 at the front side of the backrest part 220 for supporting the waist of the user.

Comparing with the above embodiment shown in FIGS. 2-5, the inflatable seat 200 of this embodiment does not require to remove several portions of the main body and sew a PVC sandwich mesh fabric in each replacement region to form multiple PVC sandwich fabric regions, so that the manufacturing process is easy and the waste of the material is reduced.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. An inflatable seat, comprising:
 a seat part; and
  a backrest part which is connected to said seat part to define an inflation chamber, wherein said backrest part comprises a first layer and a second layer, wherein said second layer comprises a first folding line and a second folding line which are connected with each other to form a connecting seam, wherein when said backrest part is inflated, said connecting seam causes said second layer to be deformed to form a concave groove while said first layer forms a protrusion section.

2. The inflatable seat according to claim 1, wherein when said backrest part is inflated, said first layer forms a curved surface with a raised peak position at a center of the said protrusion section.

3. The inflatable seat according to claim 1, further comprising a first body layer and a second body layer which is connected to said first body layer to form said seat part and said backrest part, wherein said first layer is a part of said first body layer, said second layer is a part of said second body layer, wherein said first body layer comprises a first bending line and a second bending line which are connected with other to form a bending seam, wherein when said inflation chamber is inflated, said bending seam causes said first body layer and said second body layer to bend to form said backrest part and said seat part.

4. The inflatable seat according to claim 3, wherein said second layer comprises a folding portion defined between said first folding line and said second folding line, wherein said first layer comprises a bending portion defined between said first bending line and said second bending line, wherein when said inflation chamber is inflated, said folding portion is positioned above said bending portion.

5. The inflatable seat according to claim 4, wherein a length of said folding portion is smaller than a length of said bending portion.

6. The inflatable seat according to claim 3, wherein said first folding line and said second folding line are parallel horizontal lines, wherein said first bending line and said second bending line are parallel horizontal lines.

7. The inflatable seat according to claim 3, further comprising a first connecting layer which is attached to said first body layer to fix said bending seam and a second connecting layer which is attached to said second body layer to fix said connecting seam.

8. The inflatable seat according to claim 1, further comprising a support bar which is arranged to be capable of being placed under said seat part to support said seat part, so as to adjust the position of said protrusion section of said backrest part when the inflatable seat is inflated.

9. The inflatable seat according to claim 8, wherein said support bar comprises at least one inclined support surface and at least one flat base surface, wherein when said at least one flat base surface is supported on an environment surface, said at least one inclined support surface is arranged to support said seat part.

10. The inflatable seat according to claim 8, wherein said support bar comprises a first inclined support surface, a second inclined support surface, a third flat base surface opposite to said first inclined support surface and a fourth flat base surface opposite to said second inclined support surface, wherein said first inclined support surface and said second inclined support surface are respectively arranged for supporting said seat part to allow different positions of said protrusion section of said backrest part when said inflation chamber is inflated.

11. The inflatable seat according to claim 10, wherein said first inclined support surface and said second inclined support surface define different inclination angles with respect to an environment surface.

12. The inflatable seat according to claim 3, further comprising a support bar which comprises a first inclined support surface, a second inclined support surface, a third flat base surface opposite to said first inclined support surface and a fourth flat base surface opposite to said second inclined support surface, wherein said first inclined support surface and said second inclined support surface are respectively arranged for supporting said seat part to allow different positions of said protrusion section of said backrest part when said inflation chamber is inflated.

13. The inflatable seat according to claim 3, wherein each of said first body layer and said second body layer is made of inflation brushed cloth, wherein the inflatable seat further comprises a first side layer and a second side layer which are respectively connected to said first body layer and said second body layer to form said inflation chamber, wherein each of said first side layer and said second side layer is made of PVC.

14. The inflatable seat according to claim 12, wherein said support bar is detachably coupled to a bottom of said seat part through a Velcro means.

15. An inflatable seat, comprising:
a seat part; and
a backrest part which is connected to said seat part to define an inflation chamber, wherein said backrest part comprises a first layer and a second layer, wherein said second layer comprises a folding portion which is folded into said inflation chamber, so as to cause said first layer to form a curved surface with a raised peak position for conforming to a back of a user when said backrest part is inflated.

16. The inflatable seat according to claim 15, wherein said folding portion is extended into said inflation chamber, so as to be received and hidden in said inflation chamber, wherein when said backrest part is inflated, said second layer inwardly concave towards a direction of said first layer, so as to allow said first layer to form to form said curved surface.

17. The inflatable seat according to claim 15, further comprising a first body layer and a second body layer which is connected to said first body layer to form said seat part and said backrest part, wherein said first layer is a part of said first body layer, said second layer is a part of said second body layer, wherein said first body layer comprises a bending portion which is folded into said inflation chamber, so as to cause said first body layer and said second body layer to bend to form said backrest part and said seat part.

18. The inflatable seat according to claim 15, further comprising a support bar which comprises a first inclined support surface, a second inclined support surface, a third flat base surface opposite to said first inclined support surface and a fourth flat base surface opposite to said second inclined support surface, wherein said first inclined support surface and said second inclined support surface are respectively arranged for supporting said seat part to allow different positions of said raised peak position of said backrest part when said inflation chamber is inflated.

19. An inflatable seat, comprising:
a seat part; and
a backrest part which is connected to said seat part to define an inflation chamber, wherein said backrest part comprises a first effective inflation layer and a second effective inflation layer, wherein each of said first effective inflation layer and said second effective inflation layer is made of inflation brushed cloth and an area difference between said first effective inflation layer and said second effective inflation layer causes said first effective inflation layer to form a curved surface for conforming to a back of a user when said backrest part is inflated.

20. The inflatable seat according to claim 19, wherein said backrest part comprises a first layer and a second layer which is shaped and sized to couple with said first layer, wherein said first layer forms said first effective inflation layer, said second layer comprises a folding portion which is folded into said inflation chamber, rendering an area of said second effective inflation layer being smaller than an area of said first effective inflation layer.

21. The inflatable seat according to claim 19, wherein said first effective inflation layer comprises a plurality of surface regions, wherein said backrest part further comprises one or more PVC sandwich mesh fabric region each is connected between two adjacent surface regions of said first effective inflation layer, rendering an area of said first effective inflation layer being smaller than an area of said second effective inflation layer.

\* \* \* \* \*